(12) United States Patent
Sasagawa

(10) Patent No.: US 11,212,409 B2
(45) Date of Patent: Dec. 28, 2021

(54) INFORMATION PROCESSING DEVICE FOR REGISTERING AND DISPLAYING A CHARACTER STRING, AND INFORMATION PROCESSING METHOD AND STORAGE MEDIUM THEREOF

(71) Applicant: CANON KABUSHIKI KAISHA, Tokyo (JP)

(72) Inventor: Naoto Sasagawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/983,568

(22) Filed: Aug. 3, 2020

(65) Prior Publication Data

US 2021/0044716 A1 Feb. 11, 2021

(30) Foreign Application Priority Data

Aug. 9, 2019 (JP) .............................. JP2019-147612

(51) Int. Cl.
*G06F 3/12* (2006.01)
*H04N 1/00* (2006.01)

(52) U.S. Cl.
CPC ..... *H04N 1/00891* (2013.01); *H04N 1/00421* (2013.01); *H04N 1/00896* (2013.01)

(58) Field of Classification Search
None
See application file for complete search history.

(56) References Cited

U.S. PATENT DOCUMENTS

| 6,646,657 | B1 * | 11/2003 | Rouser | G09G 5/00 |
| | | | | 715/741 |
| 7,158,169 | B1 * | 1/2007 | Farber | H04N 21/4349 |
| | | | | 348/173 |
| 10,659,644 | B2 * | 5/2020 | Kim | H04N 1/00896 |
| 2004/0075701 | A1 * | 4/2004 | Ng | H04M 1/72436 |
| | | | | 715/867 |
| 2006/0015827 | A1 * | 1/2006 | Ferguson | G06Q 30/02 |
| | | | | 715/867 |
| 2006/0145950 | A1 * | 7/2006 | Tanaka | G01N 35/00594 |
| | | | | 345/48 |
| 2010/0153764 | A1 * | 6/2010 | Pratt | G06F 3/0484 |
| | | | | 713/324 |
| 2015/0052488 | A1 * | 2/2015 | Rybchin | G06F 1/3231 |
| | | | | 715/867 |

FOREIGN PATENT DOCUMENTS

JP 2019-10787 A 1/2019

\* cited by examiner

*Primary Examiner* — Henok Shiferaw
(74) *Attorney, Agent, or Firm* — Canon U.S.A., Inc. I.P. Division

(57) ABSTRACT

According to at least one embodiment of the present disclosure, when no user operation has been performed for a set period, an information processing device is caused to transition to a sleep mode including stopping display on a display unit. However, the information processing device is controlled to not transition to the sleep mode until a slideshow currently being displayed on the display unit, ends, in a case where the slideshow has been started.

14 Claims, 24 Drawing Sheets

FIG. 6

| | Timer/Power setting | |
|---|---|---|
| Current date and time setting | | > |
| Date/Time setting | | > |
| Auto-clear | : 2 minutes | > |
| Auto-sleep | : 5 minutes | > |
| Auto-shutdown | : 4 hours | > |

FIG. 11

| Application Management | | | |
|---|---|---|---|
| Application name | State | | |
| Fixed address scan | Enabled | Disabled | |
| ECO setting selection | Enabled | Disabled | |
| Notice display | Enabled | Disabled | |
| ⋮ | | | |

402

403

404

INFORMATION PROCESSING DEVICE FOR REGISTERING AND DISPLAYING A CHARACTER STRING, AND INFORMATION PROCESSING METHOD AND STORAGE MEDIUM THEREOF

BACKGROUND

Field

The present disclosure relates to an information processing device, an information processing method, and a storage medium.

Description of the Related Art

"Digital signage" that sends out information in places such as an outdoor location, a shop, a public space, or a transportation system, by using a display connected to a network has been widely used. Further, in offices of companies or the like, digital signage has also been used for the purpose of supporting information sharing to employees or information control in a company.

In information processing devices, a technology of displaying a content of a slideshow on a display unit of the information processing device is known. Japanese Patent Application Laid-Open No. 2019-10787 discloses a technology for displaying a slideshow content when a certain period (auto-clear transition period) elapses without any operation being performed by a user on the information processing device.

In the technology disclosed in Japanese Patent Application Laid-Open No. 2019-10787, however, there is no consideration for the following points. In common information processing devices, an auto-sleep function is used to stop power supply to a display unit and other units for power saving when a certain period (auto-sleep transition period) has elapsed without any operation being performed by the user. When the auto-sleep transition period elapses without any operation being performed by the user while a signage application is displaying a content, power supply to the display unit is stopped, and the content is unable to be displayed. When the content is a slideshow, if the auto-sleep transition period expires before the end of display of the slideshow, power supply to the display unit is cut off, and the slideshow is interrupted.

SUMMARY

An information processing device according to one embodiment of the present disclosure includes: a registration unit that registers a character string; a display control unit that displays the registered character string on a display unit based on a condition that no user operation was performed for a first period; and a control unit that stops display on the display unit based on at least a condition that no user operation was performed for a second period, where the control unit does not stop display on the display unit until at least the display of the registered character string is completed.

Further features of the present disclosure will become apparent from the following description of exemplary embodiments with reference to the attached drawings.

BRIEF DESCRIPTION OF THE DRAWINGS

FIG. 6 is a diagram illustrating an example of a time/power setting window according to one embodiment.

FIG. 11 is a diagram illustrating an example of an application management window of the RUI according to one embodiment.

DESCRIPTION OF THE EMBODIMENTS

Various embodiments of the present disclosure will be described below with reference to the drawings.

First Embodiment

Figure 1:
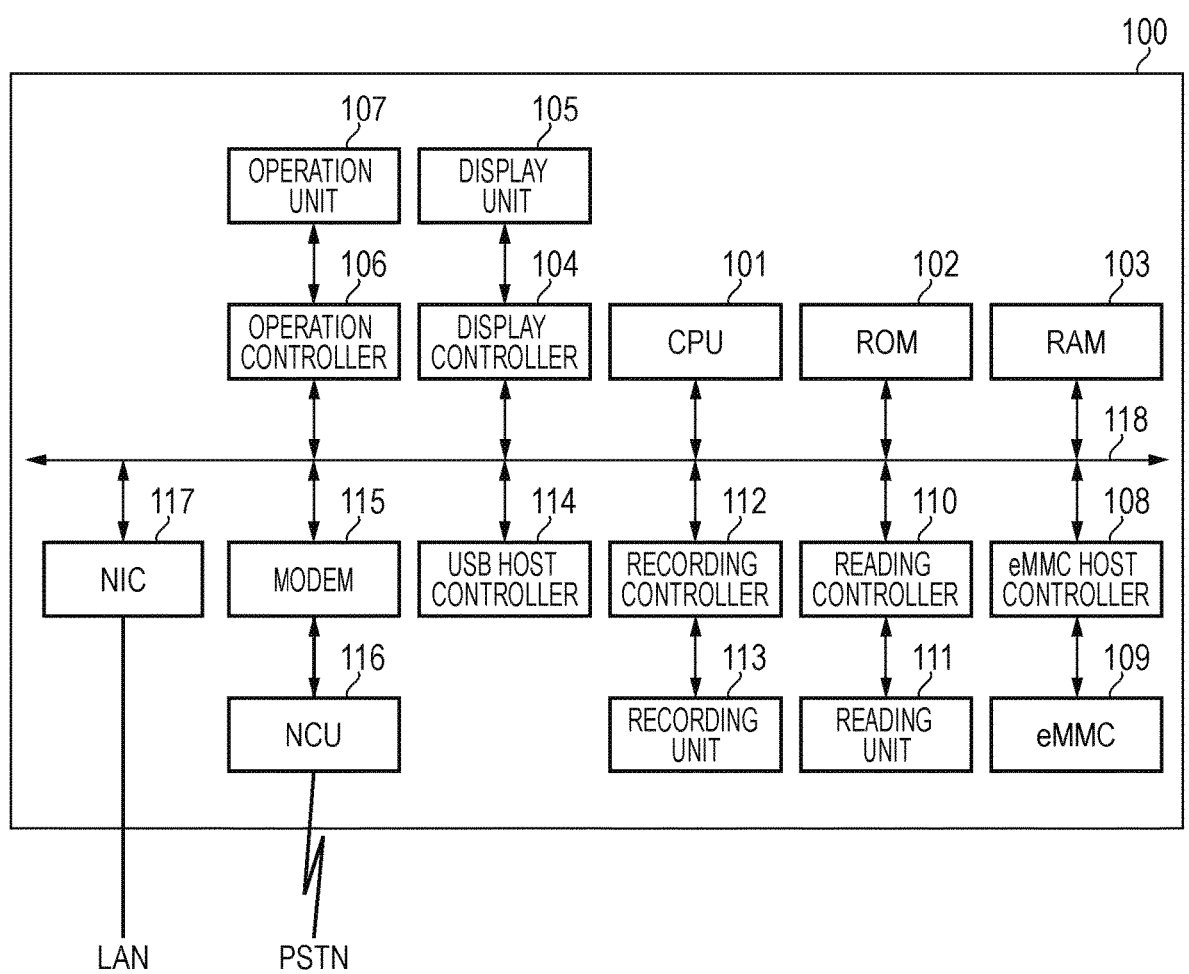
FIG. 1 is a diagram illustrating an example of a hardware configuration of an information processing device according to one embodiment.

FIG. 1 is a diagram illustrating an example of a hardware configuration of an information processing device according to one embodiment.

As illustrated in FIG. 1, an information processing device 100 has a CPU 101, a ROM 102, a RAM 103, a display controller 104, a display unit 105, an operation controller 106, and an operation unit 107. Further, the information processing device 100 has an eMMC host controller 108, an eMMC 109, a reading controller 110, a reading unit 111, a recording controller 112, and a recording unit 113. The information processing device 100 further has a USB host controller 114, a modem 115, a network control unit (NCU) 116, and a network interface card (NIC) 117.

The CPU 101 generally controls each device connected to a system bus 118. When power is supplied, the CPU 101 executes a boot program stored in the ROM 102. Typically, the boot program is configured to load a main program stored in a particular region of the eMMC 109 into the RAM 103 and jump to the head of the loaded main program. The RAM 103 functions not only as a loading place of the main program but also as a work area of the main program or the like.

The display controller 104 controls rendering on the display unit 105. The display unit 105 is a full-bitmap LCD of the WVGA size. On the other hand, the operation controller 106 controls input from the operation unit 107. The operation unit 107 is formed of a touch panel overlapped on the display unit 105.

The reading unit 111 reads a manuscript. An auto document feeder (not illustrated) is mounted on the reading unit 111 as an option, and a plurality of manuscripts can be automatically read. The reading unit 111 is connected to the reading controller 110, and the CPU 101 transacts with the reading unit 111 via the reading controller 110.

Further, the recording unit 113 electrographically forms an image on a recording sheet. The recording unit 113 is connected to the recording controller 112, and the CPU 101 transacts with the recording unit 113 via the recording controller 112.

The USB host controller 114 is responsible for protocol control of the USB and intermediates access to a USB device such as a USB memory.

The modem 115 modulates a signal required for facsimile communication. Further, the modem 115 is connected to the NCU 116. A signal modulated by the modem 115 is transmitted to a public switched telephone network (PSTN) via the NCU 116.

The NIC 117 transfers data to and from a mail server and a file server bi-directionally via a LAN, and this enables the information processing device 100 to perform email transmission or a file transmission. The information processing device 100 is connected to a computer that is an external terminal so as to be able to perform HTTP communication and can accept execution of a job, such as printing, from the computer. Further, by accessing the IP address of the information processing device 100 from a web browser installed in a computer, it is possible to display remote user interface (RUI) on the web browser. The user may inquire about the status of the information processing device 100 or change settings through an operation on the RUI.

The information processing device 100 of the present embodiment has the eMMC 109 as storage. The CPU 101 accesses the eMMC 109 via the eMMC host controller 108.

Figure 2:
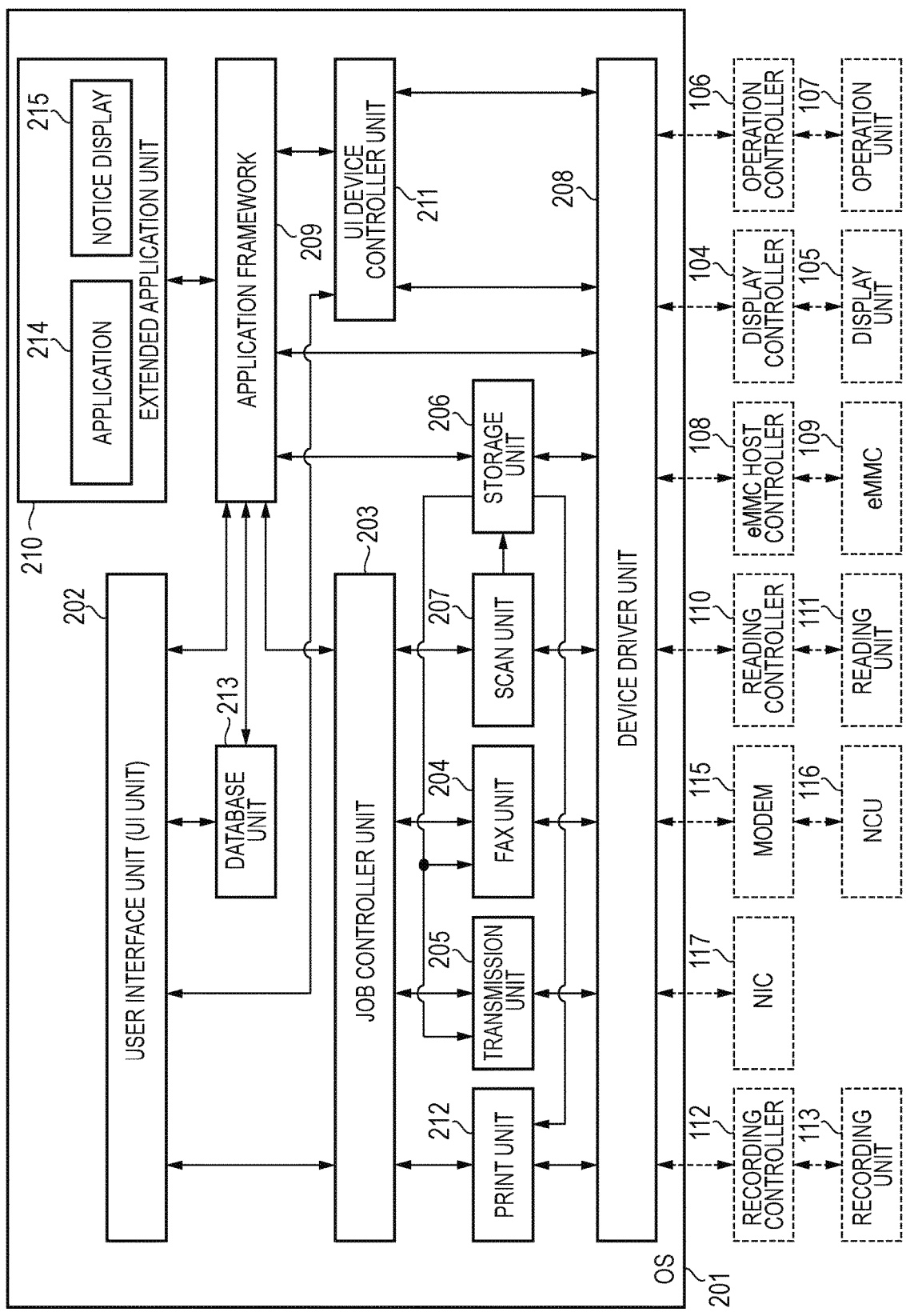
FIG. 2 is a diagram illustrating an example of a software configuration of an information processing device according to one embodiment.

FIG. 2 is a diagram illustrating an example of a software configuration of the information processing device 100 according to one embodiment. Each unit illustrated by a solid line in FIG. 2 is a software module implemented when the CPU 101 executes the main program loaded into the RAM 103 by using the boot program described above.

In the main program, execution of respective modules described later is managed and controlled by operating system (OS) 201. A device driver unit 208 is combined to the OS 201. The device driver unit 208 intermediates transaction with a hardware device such as the display controller 104, the operation controller 106, the reading controller 110, or the like.

A user interface unit (UI unit) 202 provides various information to the user via the display unit 105 and the operation unit 107 and accepts various instructions from the user. Various settings that switch behavior of the information processing device 100 can also be changed by the UI unit 202. The various settings changed by the UI unit 202 are physically stored in the eMMC 109 via a database unit 213. The settings also include a setting of a display language on the display unit 105. The UI unit 202 selects a character set used for display on the display unit 105 in accordance with the setting of the display language.

A job controller unit 203 accepts a job such as copying, printing, facsimile, or the like and controls execution of the accepted job.

A storage unit 206 is a software module that physically stores data such as an image to be printed, an image of facsimile to be transmitted or received, an application setting requested from an extended application unit 210 in the eMMC 109 and manages the stored data, for example.

In the information processing device 100 of the present embodiment, once the job controller unit 203 accepts a facsimile transmission job, a scan unit 207 controls the reading unit 111 to scan a manuscript in response to receiving the job request. The scanned facsimile image data is then stored in the storage unit 206. Facsimile image data stored in the storage unit 206 is read by a fax unit 204 and transmitted by facsimile to a receiver via the modem 115 and the NCU 116. Further, image data received by facsimile from a sender via the modem 115 and the NCU 116 is taken by the fax unit 204 and stored in the storage unit 206.

The information processing device 100 of the present embodiment has a transmission function. The transmission function includes email transmission such as ScanToEmail or Internet fax (IFAX) or file transmission such as ScanToSMB, in addition to fax transmission.

In the information processing device 100 of the present embodiment, in response to accepting execution of a print job via the NIC from a computer that is an external terminal, a print unit 212 controls the recording unit 113 to perform printing in response to the job request.

Further, once the job controller unit 203 accepts a copy job, the scan unit 207 controls the reading unit 111 to scan a manuscript in response to the job request. The scan unit 207 then stores the scanned print image data in the storage unit 206. The print image data stored in the storage unit 206 is read by the print unit 212, and the print unit 212 controls the recording unit 113 to perform printing.

The information processing device 100 of the present embodiment has an application framework 209. The extended application unit 210 is physically arranged on the eMMC 109 and accommodates a plurality of applications 214 formed of any program or the like described in a script language. For example, Java (registered trademark) that is interpreter to interpret and execute a bytecode or a language system such as Lua may be used.

The application framework 209 is responsible for installing any program described in a script language or a predetermined high-level programming language in the extended application unit 210 or uninstalling such a program from the extended application unit 210. At the same time, the application framework 209 holds, on the storage unit 206, status information on the applications 214 including as to whether the installed application 214 is enabled or disabled.

The application framework 209 also has a capability of expanding an archive, if any, in which a plurality of preinstalled applications are compressed on the ROM 102 in accordance with necessity and installing the archive in the extended application unit 210. Further, in response to selection of a button displayed on the display unit 105, the application framework 209 loads the script language of the corresponding application 214 into the RAM 103 and interprets and executes the content by using the CPU 101.

Accordingly, the information processing device 100 of the present embodiment can easily implement any function such as a login application and a language switch application while maintaining removability of the function. Furthermore, in response to receiving a request from any program installed in the extended application unit 210, the application framework 209 references or changes various setting values in the database unit 213.

The application framework 209 is responsible for mediation between a function implemented by any program installed in the extended application unit 210 and an existing function. As described above, the information processing device conventionally has the functions of facsimile transmission, email transmission, and file transmission. The application framework 209 provides these functions as application programing interface (API). Accordingly, any application 214 installed in the extended application unit 210 can be used without the functions of facsimile transmission, email transmission, and file transmission being newly implemented.

The UI device controller unit 211 intermediates the operation of outputting various information from the UI unit 202 and the extended application unit 210 to the display unit 105 and the operation of transferring a user operation via the operation unit 107 to the UI unit 202 and the extended application unit 210.

Figure 3:
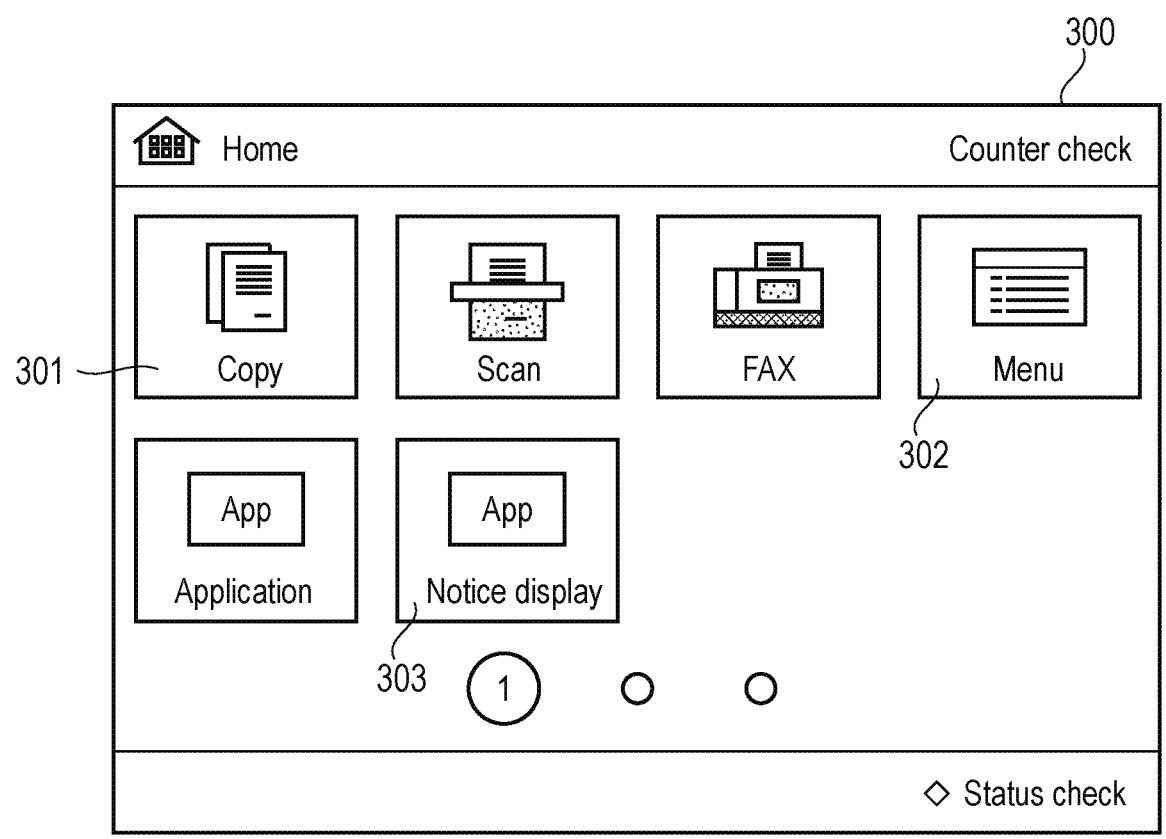
FIG. 3 is a diagram illustrating an example of a home window according to one embodiment.

FIG. 3 is a diagram illustrating an example of a home window 300 displayed on the display unit 105 of the information processing device 100 according to one embodiment. Six buttons are displayed in the home window 300 of FIG. 3. In response to selection of a menu button 302, a menu window 304 used for setting the information processing device 100 is displayed.

Figure 4:
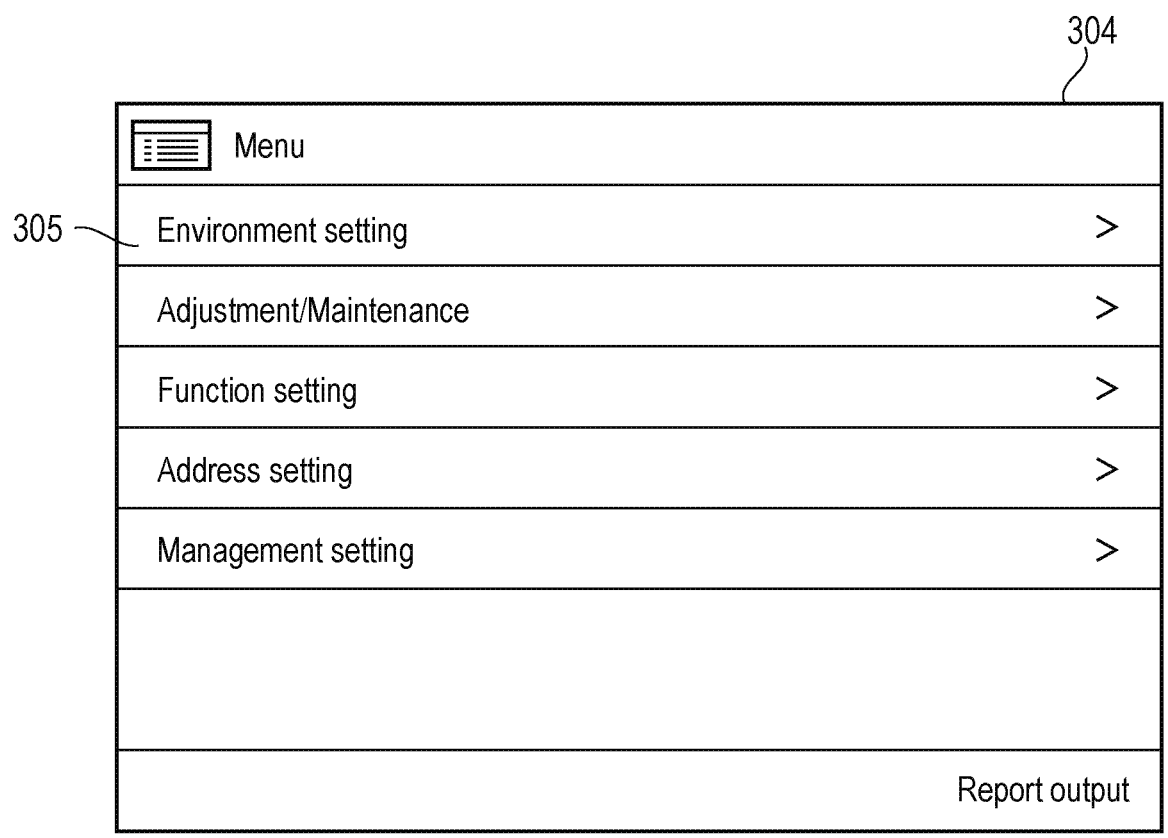
FIG. 4 is a diagram illustrating an example of a menu window according to one embodiment.

FIG. 4 is a diagram illustrating an example of the menu window 304 displayed on the display unit 105 of the information processing device 100 according to one embodiment. In response to selection of an environment setting button 305, an environment setting window 306 of FIG. 5 is displayed.

Figure 5:
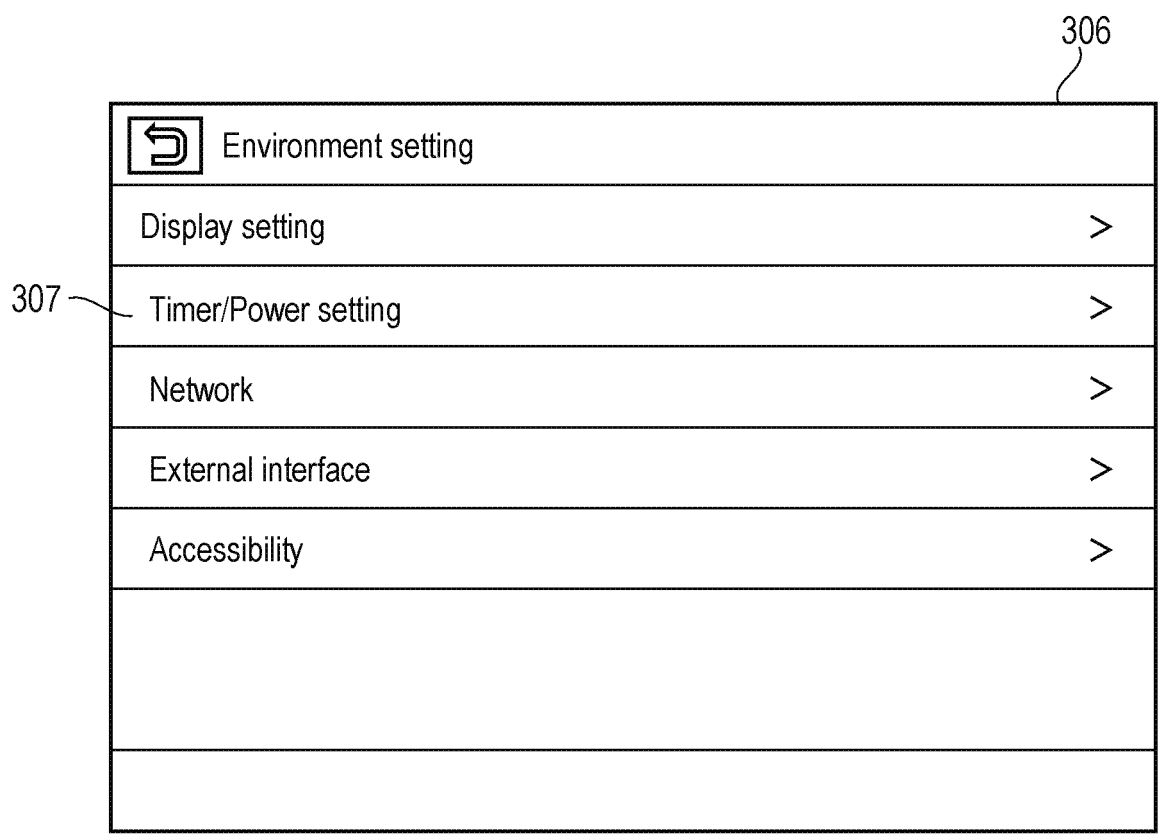
FIG. 5 is a diagram illustrating an example of an environment setting window according to one embodiment.

FIG. 5 is a diagram illustrating an example of the environment setting window 306 displayed on the display unit 105 of the information processing device 100 according to one embodiment. In "Display setting", settings related to a language to be displayed on the display unit 105 or the RUI, selection of mm/inch, or a warning are aggregated. In "Network", settings related to a network are aggregated. In "External interface", a setting as to whether or not to use the information processing device 100 as a USB device, a setting related to usage of a USB memory, or the like are prepared. In "Accessibility", a setting related to inversion of white and black or the luminance of a screen is prepared. In response to selection of a timer/power setting button 307, a timer/power setting window 308 of FIG. 6 is displayed.

FIG. 6 is a diagram illustrating an example of the timer/power setting window 308 displayed on the display unit 105 of the information processing device 100 according to one embodiment. In the tinier/power setting window 308, in addition to a setting of the current date and time and a date/time setting, an auto-clear button 309 and an auto-sleep button 310 are prepared. In response to selection of the auto-clear button 309, an auto-clear setting window 311 is displayed on the display unit 105. In response to selection of the auto-sleep button 310, an auto-sleep setting window 317 is displayed on the display unit 105.

Figure 7:
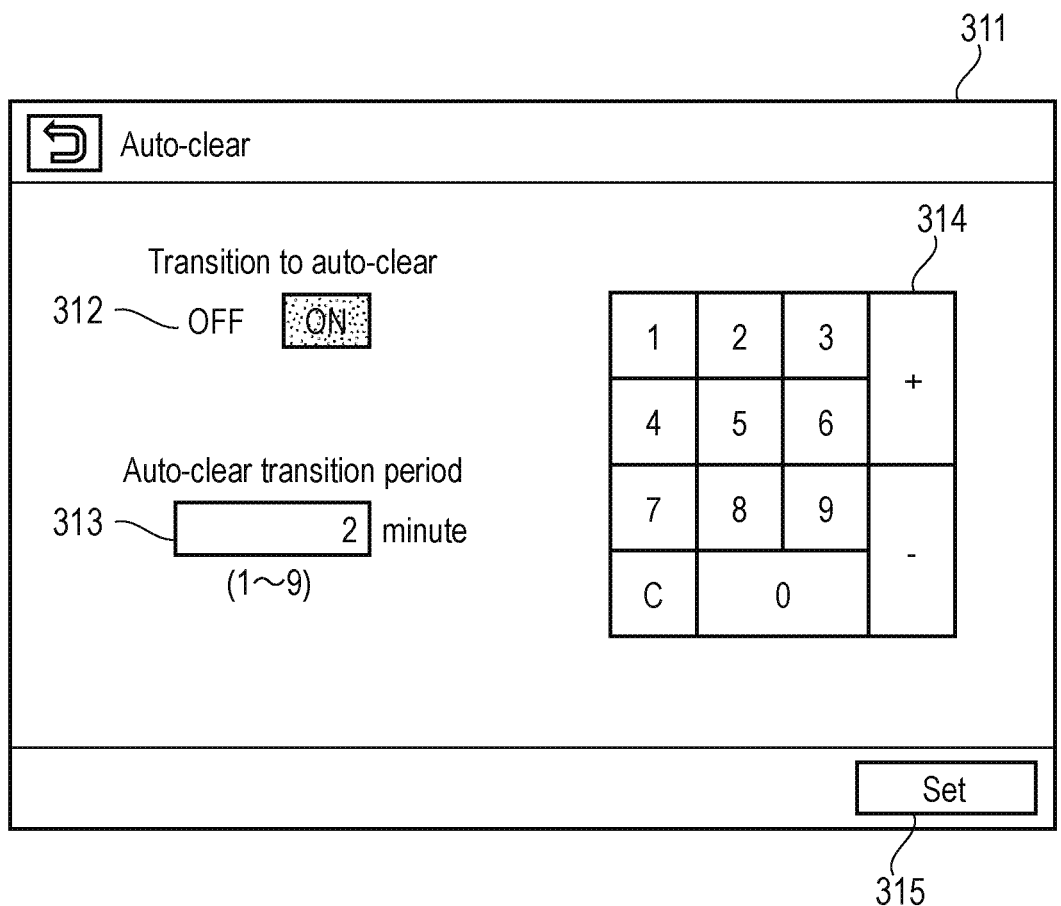
FIG. 7 is a diagram illustrating an example of an auto-clear setting window according to one embodiment.

FIG. 7 is a diagram illustrating an example of the auto-clear setting window 311 displayed on the display unit 105 of the information processing device 100 according to one embodiment. The auto-clear is a function of returning the display of the display unit 105 to the home window 300 when the auto-clear transition period has elapsed without any operation being performed by the user. In response to selection of the auto-clear button 309 of FIG. 6, the auto-clear setting window 311 is displayed on the display unit 105. The user may set disable/enable of the auto-clear function by selecting OFF or ON in 312 of FIG. 7. When the auto-clear function is enabled (ON is selected in 312 of FIG. 7), the value input to a box 313 of FIG. 7 is the auto-clear transition period (minute). The user may change the auto-clear transition period by using number keys 314. In the example of FIG. 7, one to nine minutes can be set as the auto-clear transition period. When a set button 315 is selected, the set details of the auto-clear setting window 311 are reflected to the operation of the information processing device 100.

Figure 8:
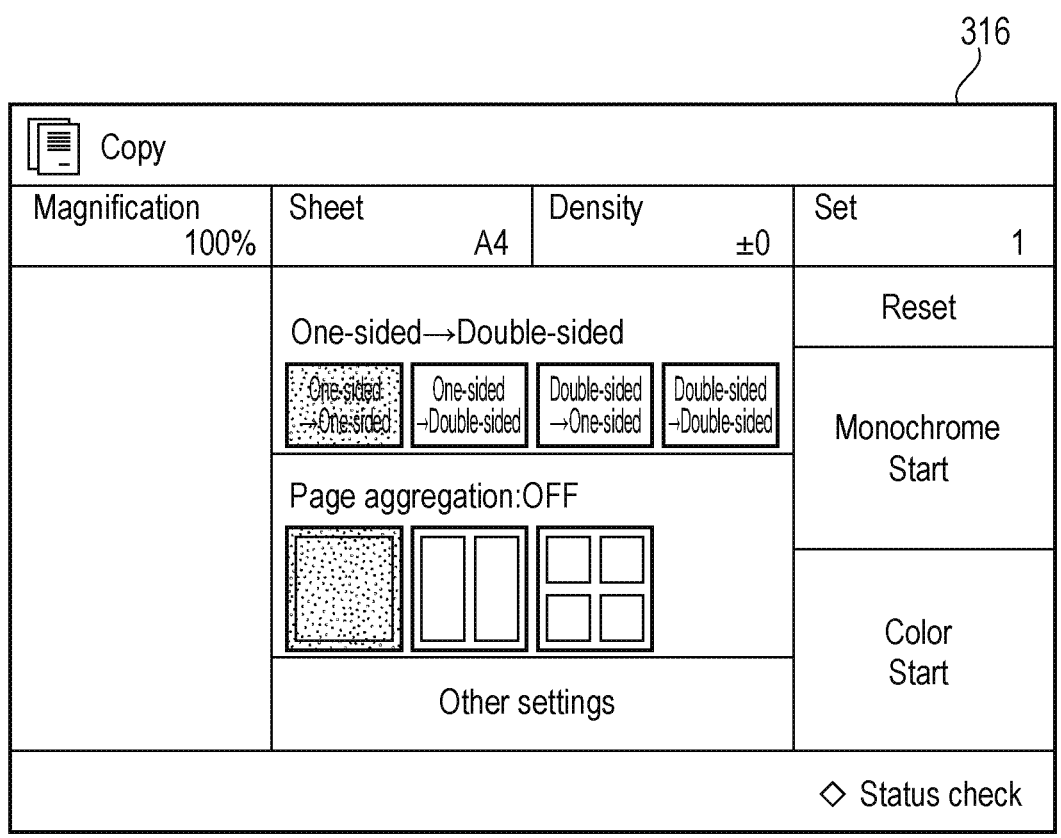
FIG. 8 is a diagram illustrating an example of a copy window according to one embodiment.

FIG. 8 is a diagram illustrating an example of a copy window 316 displayed on the display unit 105 of the information processing device 100 according to one embodiment. In response to selection of the copy button 301 in the home window 300 of FIG. 3, the copy window 316 is displayed on the display unit 105. When ON is selected in 312 of FIG. 7 (the auto-clear function is enabled), the display on the display unit 105 returns to the home window 300 if no user operation is performed before the auto-clear transition period elapses after the copy window 316 is displayed.

Figure 9:
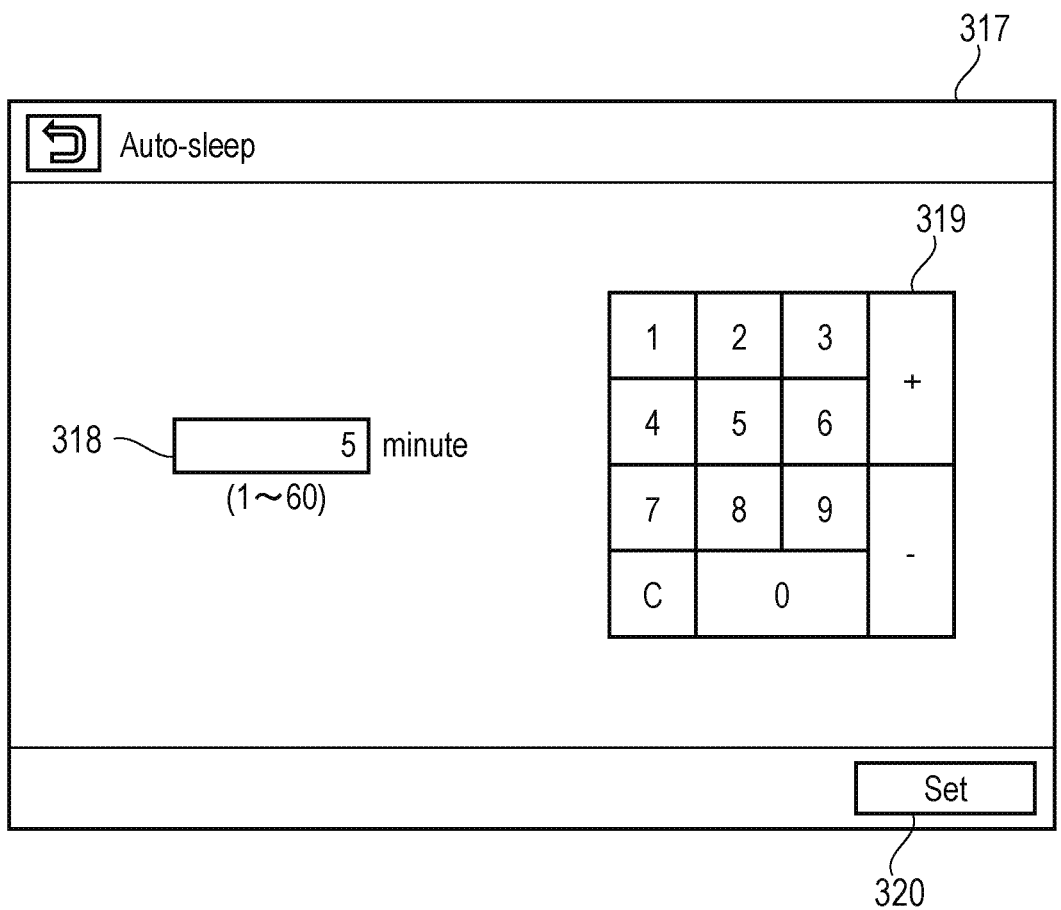
FIG. 9 is a diagram illustrating an example of an auto-sleep setting window according to one embodiment.

FIG. 9 is a diagram illustrating an example of the auto-sleep setting window 317 displayed on the display unit 105 of the information processing device 100 according to one embodiment. The auto-sleep is a function of triggering a transition to a sleep mode and stopping power supply to respective units such as the display unit 105, the reading unit 111, the recording unit 113, or the like when the auto-sleep transition period has elapsed without any operation being performed by the user. In response to transition to the sleep mode, the display unit 105 is turned off. When the information processing device 100 is in the sleep mode, an operation such as touch on the operation unit 107 or the like causes the information processing device 100 to recover to the normal operation mode. In response to selection of the auto-sleep button 310 of FIG. 6, the auto-sleep setting window 317 is displayed on the display unit 105. The value input to a box 318 of FIG. 9 is the auto-sleep transition period (minute). The user may change the auto-sleep transition period by using number keys 319. In the example of FIGS. 9, 1 to 60 minutes can be set as the auto-sleep transition period. When a set button 320 is selected, the set details of the auto-sleep setting window 317 are reflected to the operation of the information processing device 100.

Two buttons in the lower row of FIG. 3 are buttons for applications added to the extended application unit 210. A notice display button 303 is a button used for executing a signage application represented as notice display 215 (see FIG. 2) introduced to the information processing device 100.

Next, a setting procedure of the notice display 215 that is a signage application in the present embodiment will be described.

Figure 10:
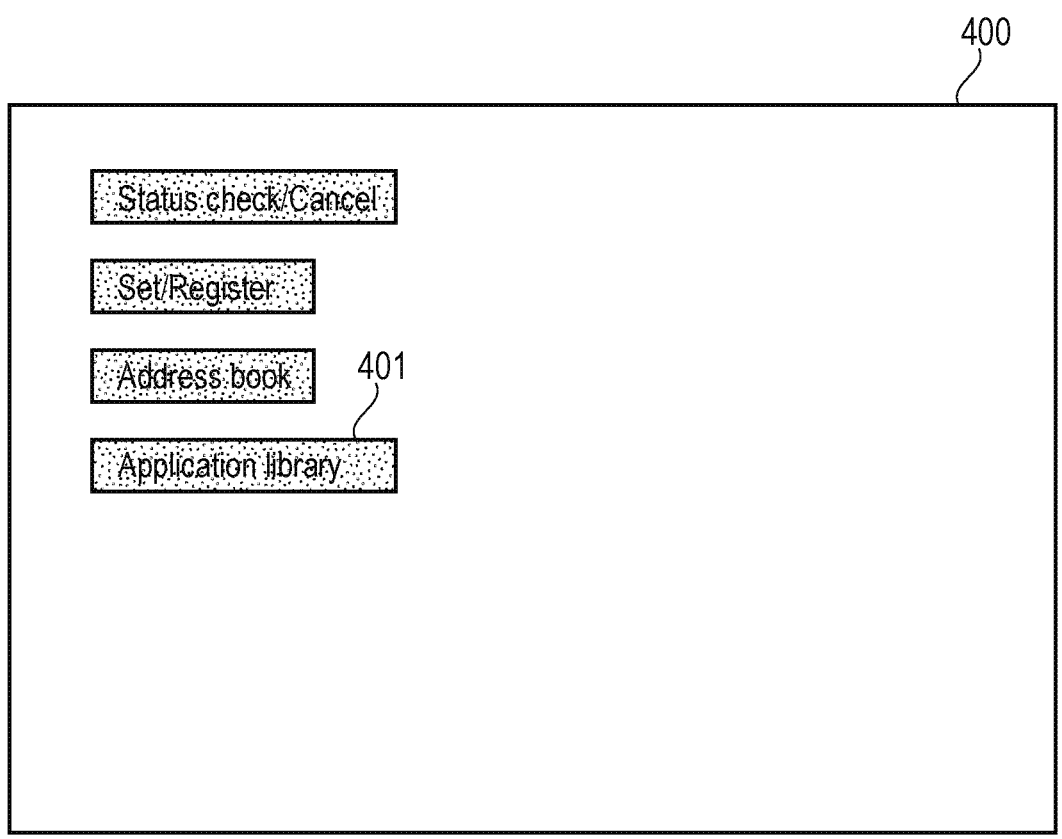
FIG. 10 is a diagram illustrating an example of the top page of RUI according to one embodiment.

FIG. 10 is a diagram illustrating an example of a top page 400 of the RUI of the information processing device 100 according to one embodiment. As described above, by accessing the IP address of the information processing device 100 from a web browser installed in a computer, it is possible to display the RUI on the web browser. Note that, when the IP address of the information processing device 100 is accessed from a web browser, the information processing device 100 may perform user authentication. In response to selection of an application library button 401, an application management window 402 is displayed.

FIG. 11 is a diagram illustrating an example of an application management window 402 of the RUI of the information processing device 100 according to one embodiment. In the application management window 402, a list of information processing device applications installed in the extended application unit 210 is displayed, and it is possible to switch display/not display of an application on the display unit 105 by selecting "Enabled" or "Disabled". For example, when a disable button 404 is selected, the button of the application is unable to be registered in the display unit 105, and the buttons displayed on the display unit 105 are not displayed accordingly. When an application name is selected, a setting window for the application is displayed. When notice display 403 is selected, a notice display setting window 405 is displayed. The application management window 402 is an example of a management window used for managing whether to enable or disable a slideshow.

Figure 12:
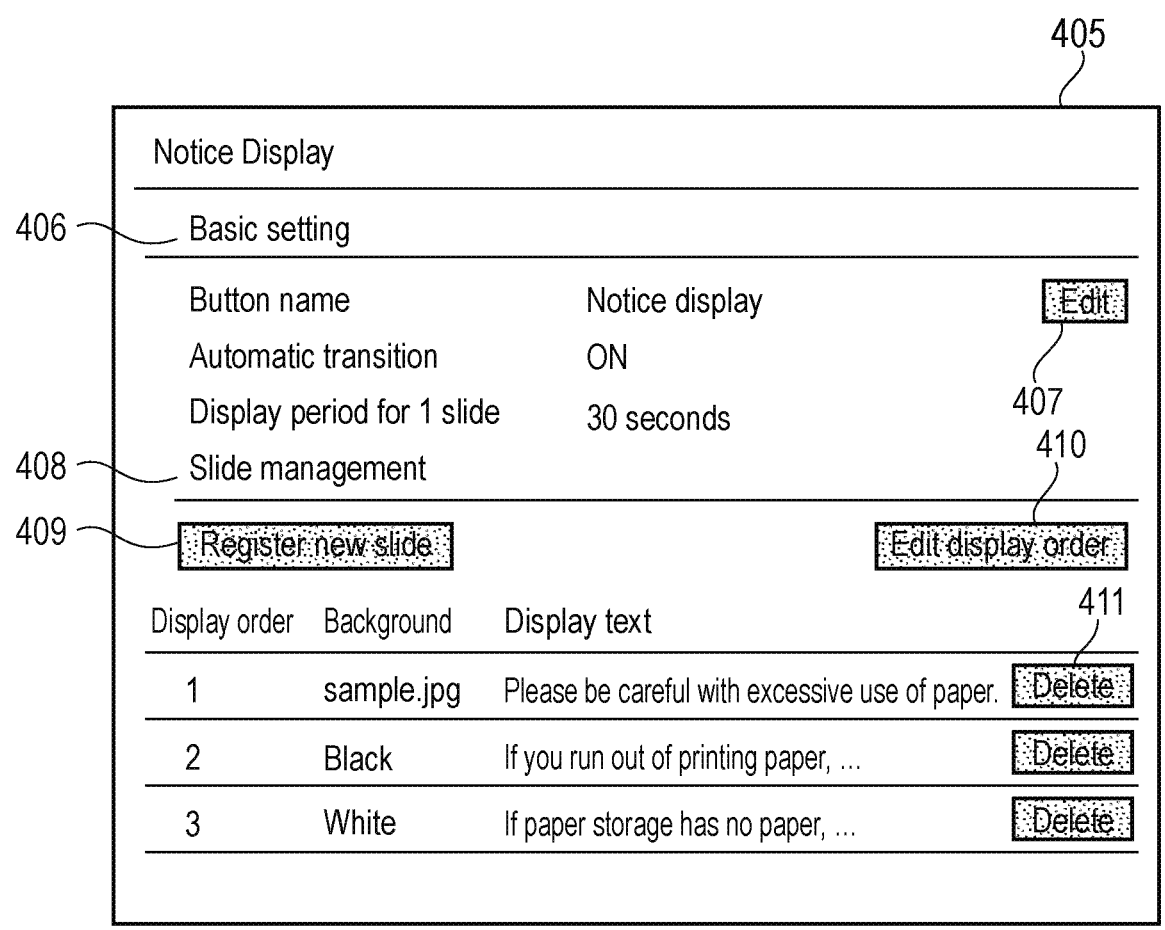
FIG. 12 is a diagram illustrating an example of a notice display setting window of the RUI according to one embodiment.

FIG. 12 is a diagram illustrating an example of the notice display setting window 405 of the RUI of the information processing device 100 according to one embodiment. In basic setting 406 in the upper part in the notice display setting window 405, setting items of a button name, ON/OFF of automatic transition, and a display period of one slide are provided. The display setting window 405 is an example of a setting window for a slideshow. In response to selection of an edit button 407, a basic setting edition window 412 of FIG. 13 is displayed.

Figure 13:
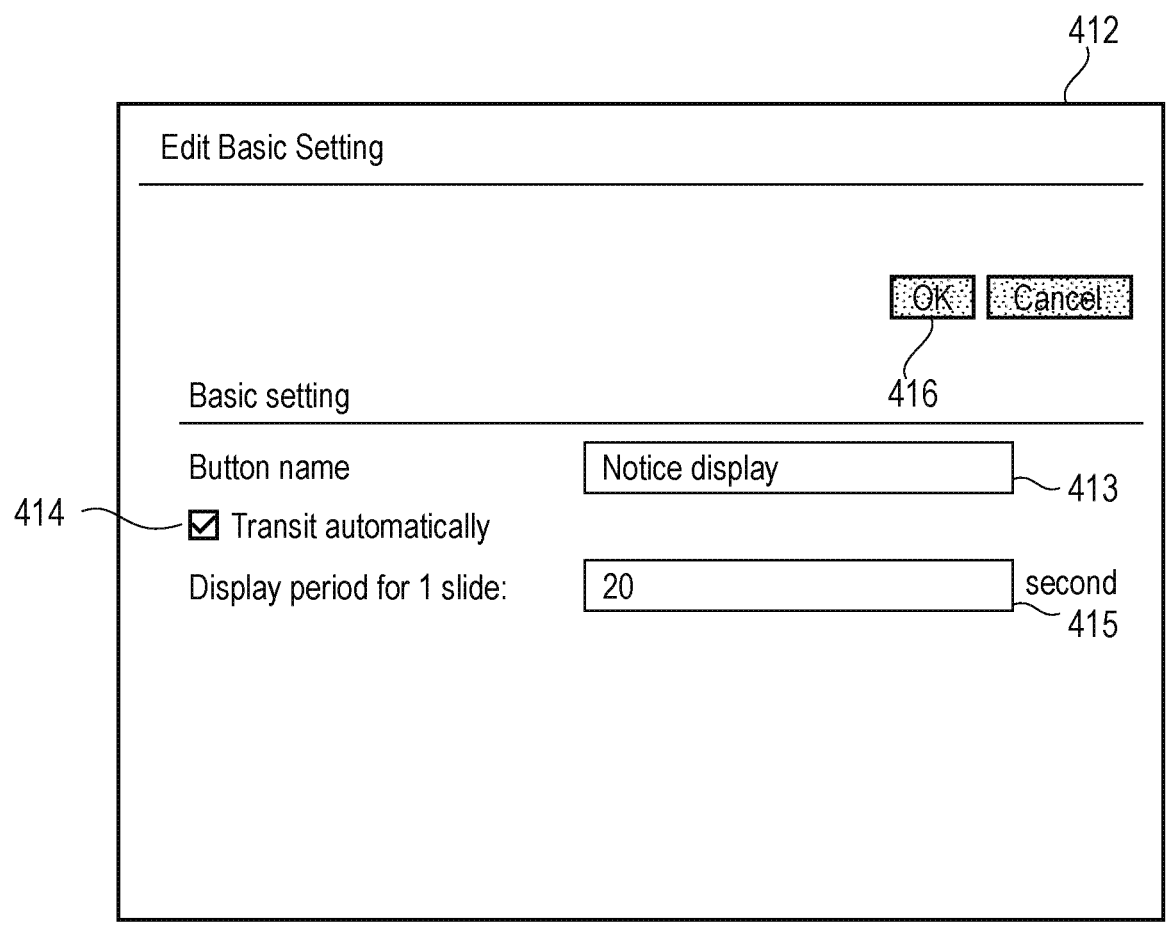
FIG. 13 is a diagram illustrating an example of a basic setting edition window of the RUI according to one embodiment.

FIG. 13 is a diagram illustrating an example of the basic setting edition window 412 of the RUI of the information processing device 100 according to one embodiment. The user may edit each item of the basic setting 406 in the edition window 412. The "Button name" is a button name of the notice display 215 displayed on the display unit 105 and is set to "Notice display" that is the same as the application name in the initial state. The user may change the button name displayed on the display unit 105 by editing a text in a text box 413 located in the right to "Button name". As described above, when the auto-clear function is enabled, typically, if the auto-clear transition period elapses without any user operation being performed, the window returns to the home window 300 of FIG. 3. When a checkbox 414 is checked, if the auto-clear transition period elapses without any user operation being performed, a slideshow registered in slide management 408 in the lower part of the notice display setting window 405 of FIG. 12 is started (the registration method will be described later). When the checkbox 414 is not checked, no slideshow is started even if the auto-clear transition period elapses without any user operation being performed. In such a case, a slideshow is started only when the notice display button 303 (see FIG. 3) is selected. The display period per one slide can be set in a text box 415.

In the present embodiment, the display period is set to 20 seconds in the initial state. The user may reflect the set details of the basic setting edition window 412 to the operation of the information processing device 100 by selecting an OK button 416. In response to selection of the OK button 416, the window returns to the notice display setting window 405 of FIG. 12. The basic setting edition window 412 is an example of a setting edition window for a slideshow.

Figure 14:
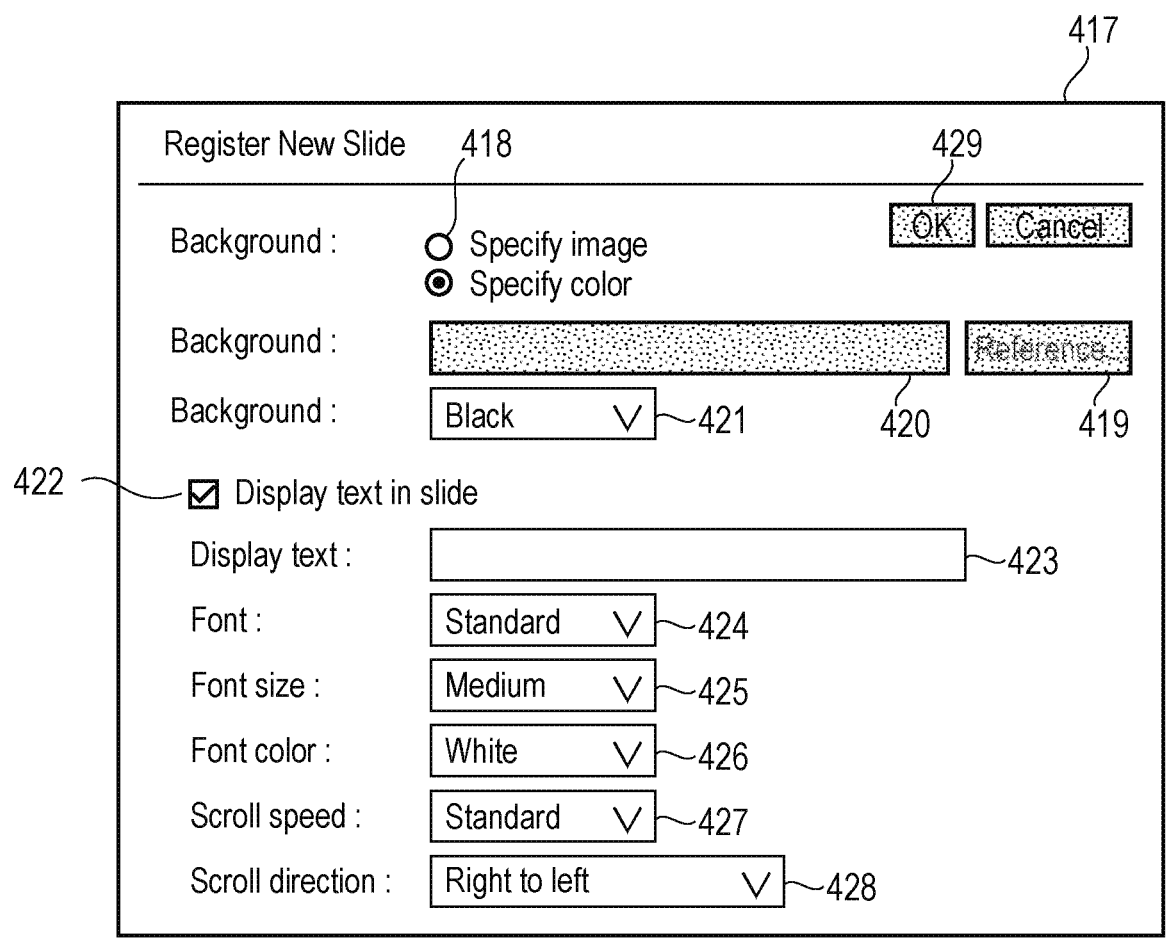
FIG. 14 is a diagram illustrating an example of a new slide registration window of the RUI according to one embodiment.

Subsequently, the slide management 408 in the lower part of the notice display setting window 405 of FIG. 12 will be described. In the example illustrated in FIG. 12, three slides have already been registered. Respective slides are arranged from the top in the display order. As the background of the slide, a single-color wallpaper may be specified, or an image file may be registered. In the display of each slide, a text can also be displayed. In the item "Displayed text", texts to be displayed are displayed. When the displayed text is long and extends outside the display of the RUI, the extending part of the text is omitted. When a deletion button 411 in the right of each slide is selected, the registration of the slide can be cancelled. In response to selection of a new slide registration button 409, a new slide registration window 417 of FIG. 14 is displayed in the RUI according to one embodiment. With selection of radio buttons 418, it is possible to select whether to use an image file or use a single-color wallpaper for the background of the slide. In the example of FIG. 14, "Specify color" of the radio buttons 418 is selected. In such a case, the setting of a file path is grayed out, and a color can be selected by using a dropdown list 421 for the background color. In the information processing device 100 of the present embodiment, the user may select a color from white, black, red, yellow, green, and blue.

On the other hand, when "Specify image" is selected from the radio buttons 418, the dropdown list 421 for the background color is unable to be used, and when a reference button 419 is selected instead, a path of an image file to be used can be specified. In a text box 420, a path of a specified image file is indicated. By checking the checkbox 422, it is possible to display a text in a slide. The user may input a displaying text in the text box 423.

By using a dropdown list 424 for a font, the user may select a font from standard, bold, italics, and bold and italics in the present embodiment. By using a dropdown list 425 for a font size, the user may select a font size from large, medium, and small in the present embodiment. By using a dropdown list 426 for a font color, the user may select a font color from white, black, red, yellow, green, and blue in the present embodiment. By using a dropdown list 427 for a scroll speed, the user may select a scroll speed from slow, standard, and fast in the present embodiment. By using a dropdown list 428 for a scroll direction, the user may select a scroll direction from not scroll, tight to left, left to right, downward, and upward in the present embodiment.

The user may reflect the set details of the new slide registration window 417 to the operation of the information processing device 100 by selecting an OK button 429. In response to selection of the OK button 429, the window returns to the notice display setting window 405 of FIG. 12. The new slide registration window 417 is an example of a new registration window for a slideshow.

Figure 15:
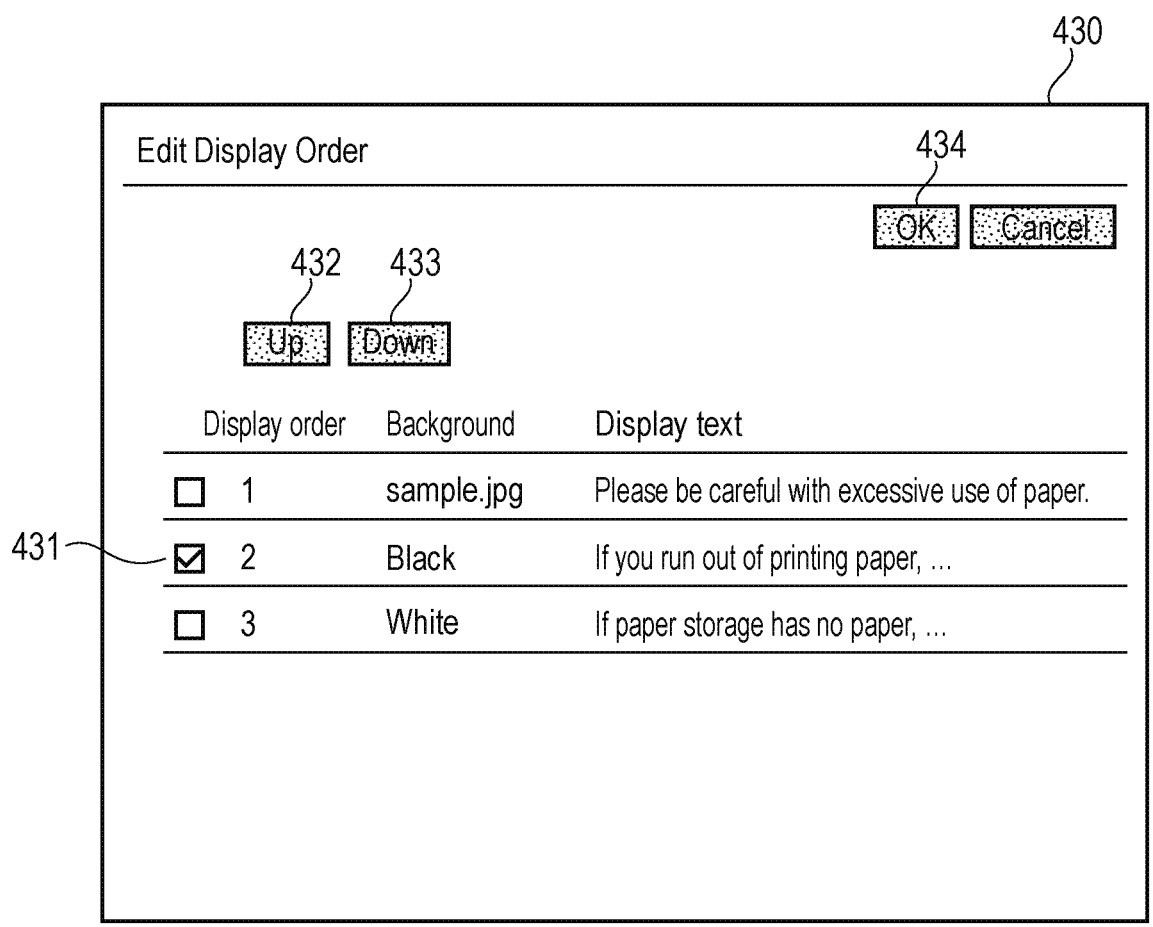
FIG. 15 is a diagram illustrating an example of a display order edition window of the RUI according to one embodiment.

In response to selection of a display order edition button 410 of FIG. 12, a display order edition window 430 of FIG. 15 is displayed in the RUI according to one embodiment. In the display order edition window 430, the user may change the display order of a slide selected from the checkboxes 431 by using an up button 432 or a down button 433. Multiple checkboxes 431 corresponding to multiple slides are unable to be checked at the same time. The user may reflect the set details of the display order edition window 430 to the operation of the information processing device 100 by selecting an OK button 434. In response to selection of the OK button 434, the window returns to the notice display setting window 405 of FIG. 12. The display order edition window 430 is an example of a display order edition window for a slideshow.

As an example of settings in the notice display setting window 405 of FIG. 12, a window transition on the display unit 105 occurring when the setting of auto-clear transition is ON (see FIG. 7) and the setting of automatic transition of the notice display 215 is ON will be described. In the example of FIG. 12, the display period of one slide is set to 30 seconds, and three slides are registered. Further, although respective display texts are set for respective slides, description will be provided assuming that the scroll directions are all set to a direction from the right to the left. As illustrated in FIG. 3, when the home window 300 is displayed on the display unit 105, in response to selection of the copy button 301, a copy window illustrated in FIG. 8 is displayed on the display unit 105. As described above, when the notice display 215 is disabled, the display on the display unit 105 returns to the home window 300 if the auto-clear transition period elapses without any user operation being performed. On the other hand, when the notice display 215 is enabled, a first slide 435 registered in the slide management 408 of FIG. 12 is displayed.

Figure 16:
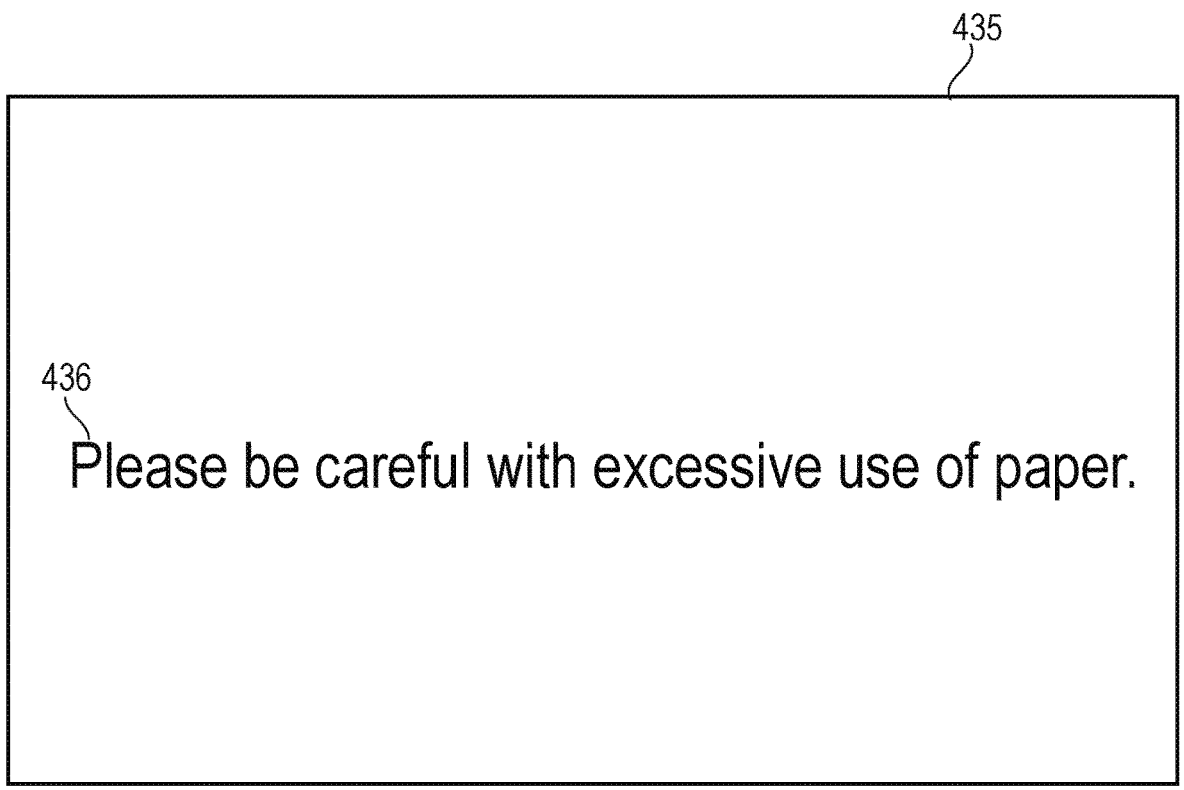
FIG. 16 is a diagram illustrating an example of a first slide displayed on a display unit according to one embodiment.

FIG. 16 is a diagram illustrating an example of the first slide 435 displayed on the display unit 105 according to one embodiment. An image file named "sample.jpg" is set for the background of the slide. A sentence "Please be careful with excessive use of paper," is set as a display text 436, and the display text 436 is scrolled from the right to the left. When the display text 436 is completely scrolled to the left end, the display text 436 starts being scrolled again from the right end. Since the display period of one slide is set to 30 seconds, this operation is repeated until 30 seconds elapse after the first slide 435 is displayed on the display unit 105. When 30 seconds have elapsed after the first slide 435 was displayed on the display unit 105, a second slide 437 is displayed on the display unit 105.

Figure 17:
FIG. 17 is a diagram illustrating an example of a second slide displayed on the display unit according to one embodiment.

FIG. 17 is a diagram illustrating an example of the second slide 437 displayed on the display unit 105 according to one embodiment. The background of the slide is set to "Specify color", and black is selected as the background color. On the other hand, white is selected as a font color of the display text. A sentence "If you run out of printing paper, please replenish it from paper storage." is set as a display text 438, and the display text 438 is scrolled from the right to the left. FIG. 17 illustrates a state where a part of the display text 438 is displayed on the display unit 105. When 30 seconds have elapsed after the second slide 437 was displayed on the display unit 105, a third slide 439 is displayed on the display unit 105.

Figure 18:
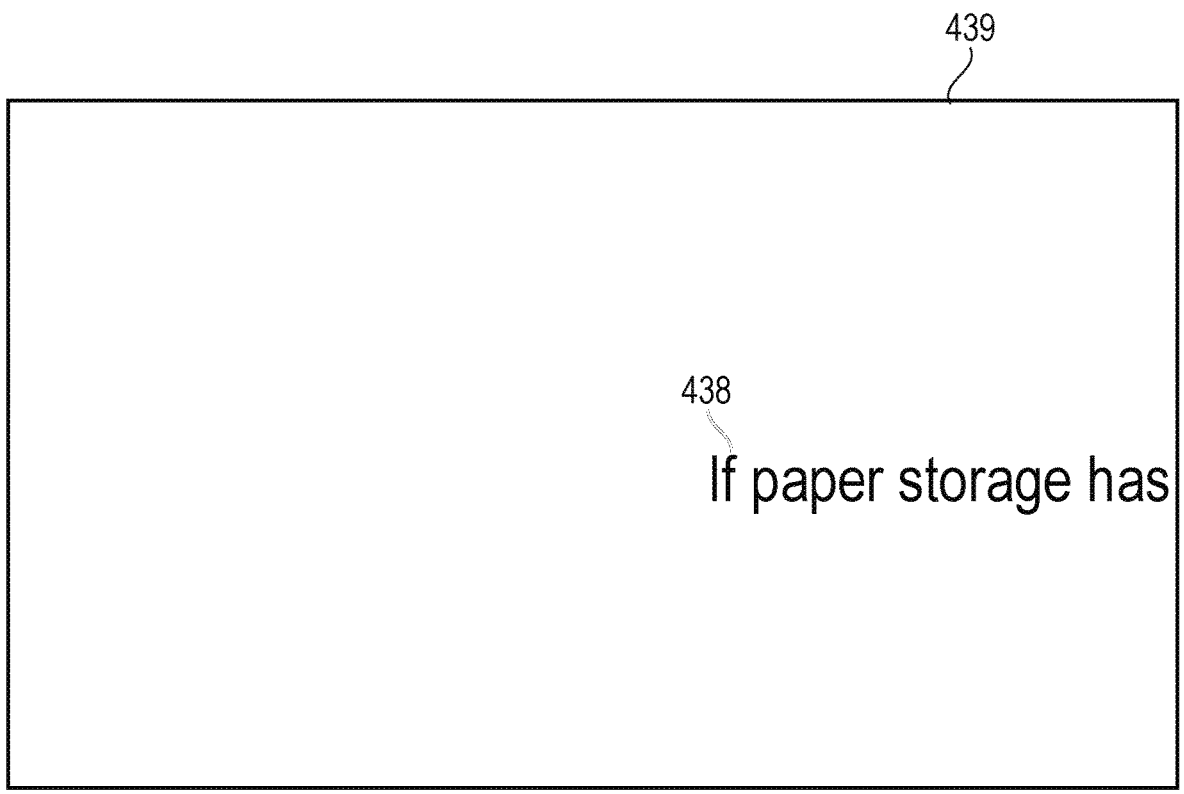
FIG. 18 is a diagram illustrating an example of a third slide displayed on the display unit according to one embodiment.

FIG. 18 is a diagram illustrating an example of the third slide 439 displayed on the display unit 105 according to one embodiment. The slide background is set to "Specify color", and white is selected as the background color. On the other hand, black is selected as the font color of the display text.

A sentence "If paper storage has no paper, please contact address: ***@***.co.jp" is set as a display text 440, and the display text 440 is scrolled from the right to the left When 30 seconds have elapsed after the third slide 439 was displayed on the display unit 105, the first slide 435 is again displayed on the display unit 105. The operation so far is one cycle of the operation of a slideshow. This operation will be repeated unless the slideshow is interrupted due to a user operation, auto-sleep, or the like For example, when a user operation is performed during display of the slideshow, the slideshow of the notice display 215 is interrupted, and the home window 300 is displayed on the display unit 105.

As described with reference to FIG. 6 and FIG. 9, the information processing device 100 has the auto-sleep function independently of the auto-clear function. As described above, if the auto-sleep transition period elapses without any user operation being performed, power supply to the display unit 105 and other units is stopped. When the auto-sleep transition period has elapsed without any user operation being performed during display of a slideshow of the notice display 215, if power supply to the display unit 105 is cut off, the slideshow will be interrupted, and a message intended to be conveyed to the user may fail to be conveyed. Accordingly, the information processing device 100 has a function of not stopping power supply to the display unit 105 at least before display of the end of a slideshow is completed.

Figure 19:
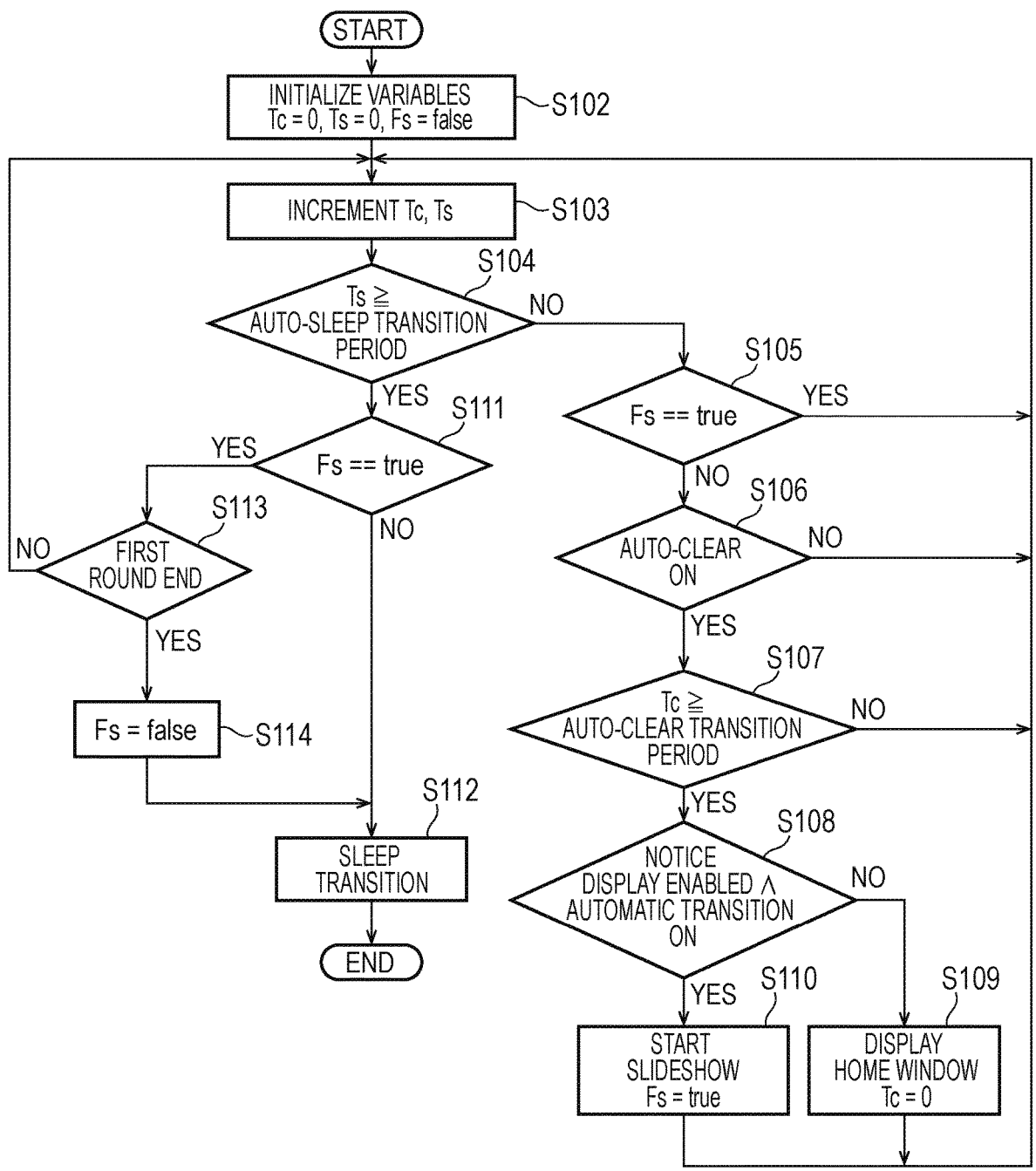
FIG. 19 is a flowchart (1) illustrating an example of information processing of a first embodiment according to one embodiment.

FIG. 19 is a flowchart illustrating an example of information processing in the information processing device 100 before a sleep transition is triggered by auto-sleep after power is ON or a user operation is performed (except a case where the notice display button 303 is selected) according to one embodiment. The operation of the case where the notice display button 303 is selected will be described separately. When a user operation is performed during the flowchart of FIG. 19, the CPU 101 returns the process to step S102 and again starts the process of the flowchart of FIG. 19.

The process illustrated in FIG. 19 is implemented when the CPU 101 loads a program stored in the ROM 102 into the RAM 103 and executes the loaded program.

The process illustrated in FIG. 19 is started when power is ON or a user operation is detected. First, in step S102, the CPU 101 initializes variables. The CPU 101 sets an auto-clear timer Tc and an auto-sleep timer Ts to 0. Further, the CPU 101 sets a flag Fs, which indicates that a slideshow is being performed, to "false" (that is, no slideshow is being performed).

Subsequently, in step S103, the CPU 101 increments Tc and Ts by a predetermined time step (for example, 1 ms).

Subsequently, in step S104, the CPU 101 determines whether or not the auto-sleep timer Ts reaches the auto-sleep transition period. If not, the CPU 101 proceeds with the process to step S105.

In step S105, the CPU 101 checks whether or not a slideshow is being performed. The CPU 101 proceeds with the process to step S103 if a slideshow is being performed and proceeds with the process to step S106 if no slideshow is being performed.

In step S106, the CPU 101 checks OFF/ON of the auto-clear function. If the auto-clear function is OFF, the CPU 101 proceeds to step S103 to increment the timer and, in step S104, again determines whether or not Ts reaches the auto-sleep transition period. In step S106, if the auto-clear function is ON, the CPU 101 proceeds with the process to step S107.

In step S107, the CPU 101 determines whether or not the auto-clear timer Tc reaches the auto-clear transition period. If Tc does not reach the auto-clear transition period, the CPU 101 returns to step S103 to increment the timer and then proceeds to the sequence from step S104 again. If Tc reaches the auto-clear transition period in step S107, the CPU 101 proceeds with the process to step S108.

In step S108, the CPU 101 determines whether or not the notice display 215 is enabled and the automatic transition to the slideshow is ON. If not (the notice display 215 is disabled or the automatic transition to the slideshow is OFF), the CPU 101 proceeds with the process to step S109.

In step S109, the CPU 101 displays the home window 300 on the display unit 105 by a normal auto-clear operation, performs a process of turning Tc back to the initial value (0), and then proceeds to step S103. If the home window 300 is displayed on the display unit 105 at the time of startup or the like, the display of the display unit 105 remains without change.

If the notice display 215 is enabled and the automatic transition to the slideshow is ON, the CPU 101 proceeds with the process to step S110.

In step S110, the CPU 101 starts the slideshow, sets Fs to "true", and then proceeds to step S103.

If the auto-sleep timer Ts reaches the auto-sleep transition period in step S104, the CPU 101 proceeds with the process to step S111.

In step S111, the CPU 101 checks whether or not a slideshow is being performed. If no slideshow is being performed, the CPU 101 proceeds with the process to step S112.

In step S112, the CPU 101 performs a sleep transition and ends the process of the flowchart. If a slideshow is being performed, the CPU 101 proceeds with the process to step S113.

In step S113, the CPU 101 determines whether or not the first round of the slideshow ends. In a method of determining whether or not the first round of a slideshow ends, when display of the last slide of the slideshow ends, this may be stored. Alternatively, the difference between the auto-clear timer Tc and the auto-clear transition period may be compared with the time required for one cycle of the slideshow. In the present embodiment, since the display period of one slide is 30 seconds and three slides are registered, the time required for one cycle of the slideshow is 90 seconds. That is, it can be determined that it is in the first round of the slideshow before 90 seconds elapse from expiration of the auto-clear transition period. If it is determined in step S113 that the first round of the slideshow does not end, the CPU 101 proceeds to step S103, In contrast, if it is determined that the first round of the slideshow ends, the CPU 101 proceeds with the process to step S114.

In step S114, the CPU 101 sets Fs to "false" and proceeds to step S112.

In step S112, the CPU 101 performs a sleep transition and ends the process of the flowchart.

Figure 20:
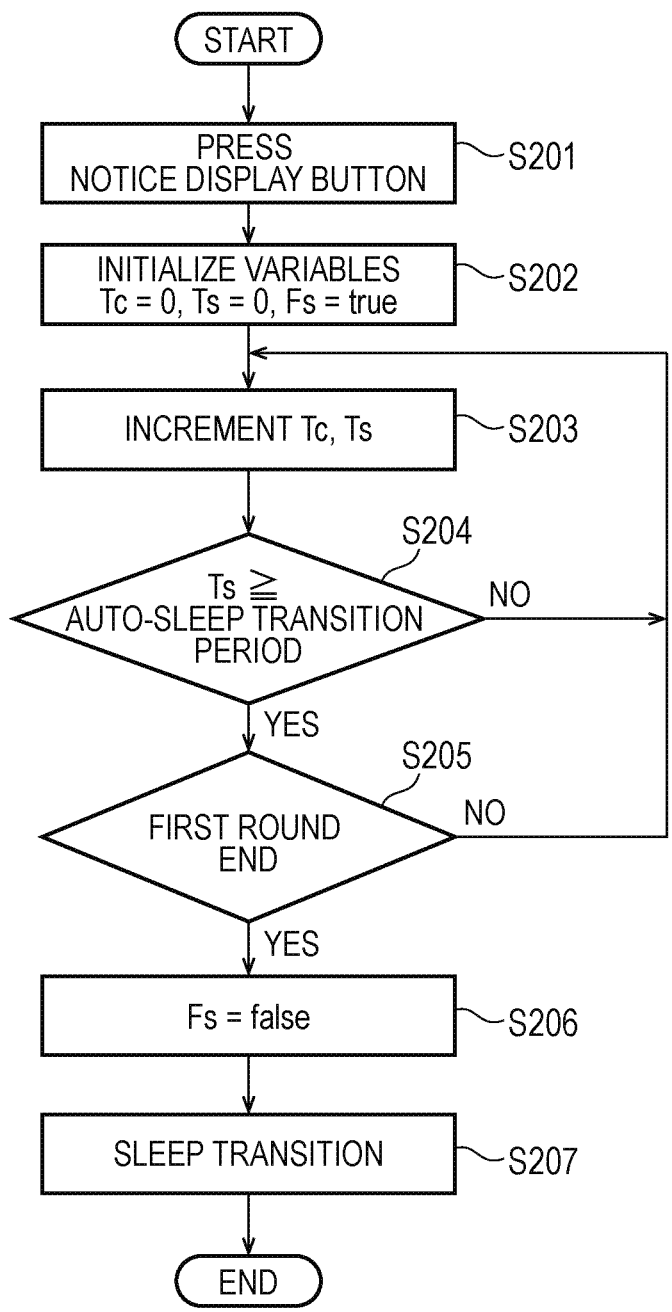
FIG. 20 is a flowchart (2) illustrating an example of information processing of the first embodiment according to one embodiment.

FIG. 20 is a flowchart illustrating an example of information processing in the information processing device 100 before a sleep transition is triggered by auto-sleep after the notice display button 303 is selected according to one embodiment, When a user operation is performed during the flowchart of FIG. 20, the CPU 101 proceeds with the process to step S102 of FIG. 19.

In step S201, in response to selection of the notice display button 303, the CPU 101 proceeds with the process to step S202.

In step S202, the CPU 101 initializes the variables. The CPU 101 sets the auto-clear timer Tc and the auto-sleep timer Ts to 0. Further, the CPU 101 sets the flag Fs, which indicates that a slideshow is being performed, to "true" (that is, a slideshow is being performed).

Subsequently, in step S203, the CPU 101 increments Tc and Ts by the predetermined time step.

Subsequently, in step S204, the CPU 101 determines whether or not the auto-sleep timer Ts reaches the auto-sleep transition period. If not, the CPU 101 returns the process to step S203. If the auto-sleep timer Ts reaches the auto-sleep transition period in step S204, the CPU 101 proceeds with the process to step S205.

In step S205, the CPU 101 determines whether or not the first round of a slideshow ends. Hit is determined in step S205 that the first round of the slideshow does not end, the CPU 101 returns the process to step S203. In contrast, if it is determined that the first round of the slideshow ends, the CPU 101 proceeds with the process to step S206.

In step S206, the CPU 101 sets Fs to "false" and proceeds to step S207.

In step S207, the CPU 101 performs a sleep transition and ends the process of the flowchart.

According to the first embodiment, in an information processing device to which a signage application for displaying a slideshow is introduced, a sleep transition during a slideshow due to the auto-sleep function can be prevented.

First Modified Example

In description of a first modified example, the description of the same features as those in the first embodiment will be omitted.

In the configuration of the first embodiment, a sleep transition during a slideshow due to the auto-sleep function can be prevented. However, when the auto-sleep transition period is shorter than the auto-clear transition period, the auto-sleep transition period expires before the auto-clear transition period expires, and therefore a sleep transition may be caused without a slideshow being started even when the notice display is enabled.

Figure 21:
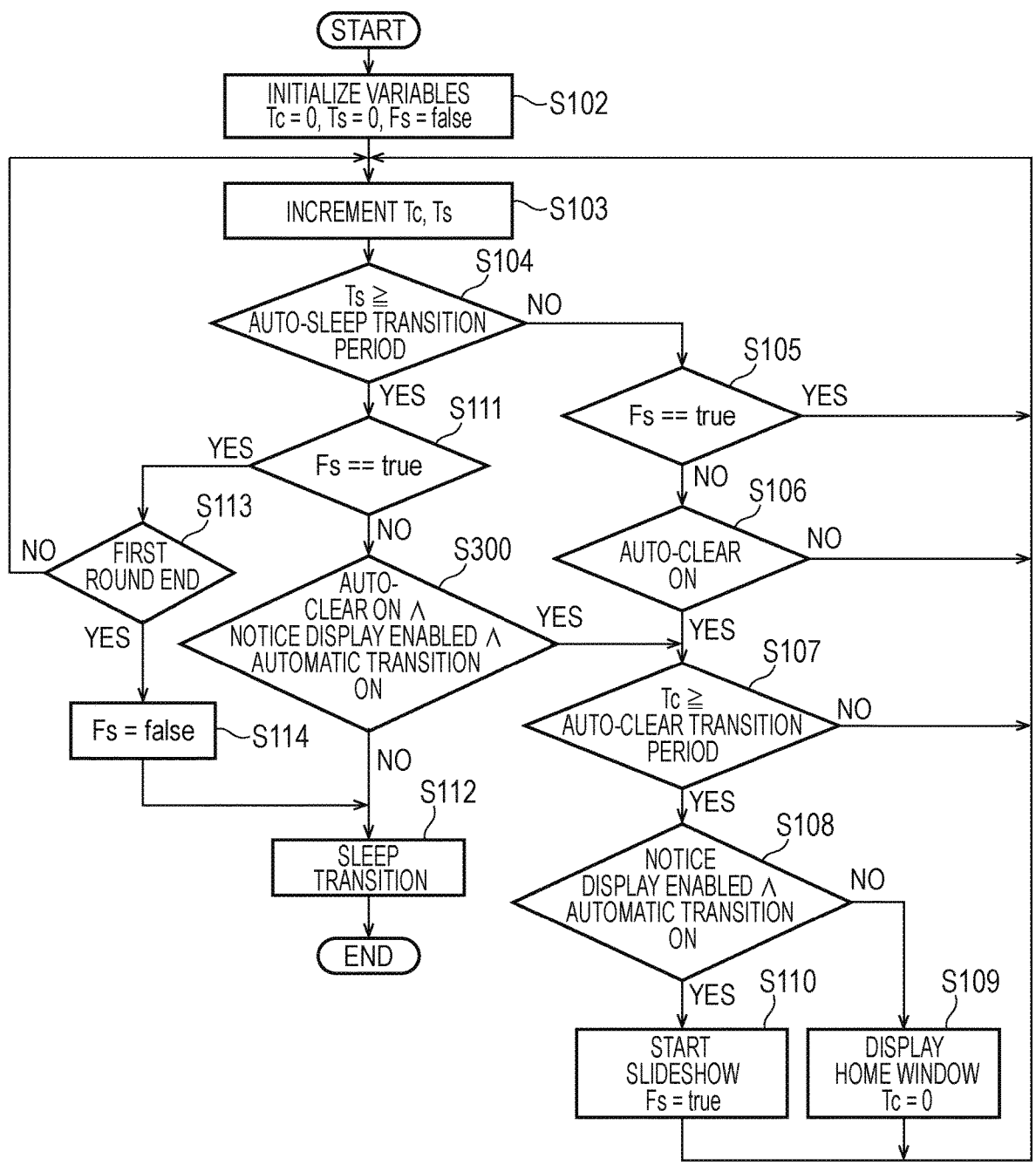
FIG. 21 is a flowchart illustrating an example of information processing of a first modified example according to one embodiment.

FIG. 21 is a flowchart illustrating an example of information processing in the information processing device 100 of the first modified example. The difference from the first embodiment is in that step S300 is added. If no slideshow is being performed in step S111, the CPU 101 proceeds with the process to step S300.

In step S300, the CPU 101 checks whether the auto-clear function is ON or OFF, whether the notice display 215 is enabled or disabled, and whether or not the automatic transition to a slideshow is ON or OFF. If the auto-clear function is ON, the notice display 215 is enabled, and the automatic transition to a slideshow is ON, the CPU 101 proceeds to step S107 without proceeding to step S112. With step S300 being added, if the auto-clear function is ON, the notice display 215 is enabled, and the automatic transition to a slideshow is ON, no sleep transition is triggered unless the first round of the slideshow started in response to expiration of the auto-clear transition period ends.

The operation of the information processing device 100 when the notice display button 303 is selected is the same as that of the first embodiment.

According to the first modified example, in an information processing device to which a signage application for displaying a slideshow is introduced, even when the auto-sleep function is enabled, at least one cycle of a slideshow can be displayed before a sleep transition.

Second Modified Example

In description of a second modified example, the description of the same features as those in the first embodiment and the first modified example will be omitted.

Figure 22:
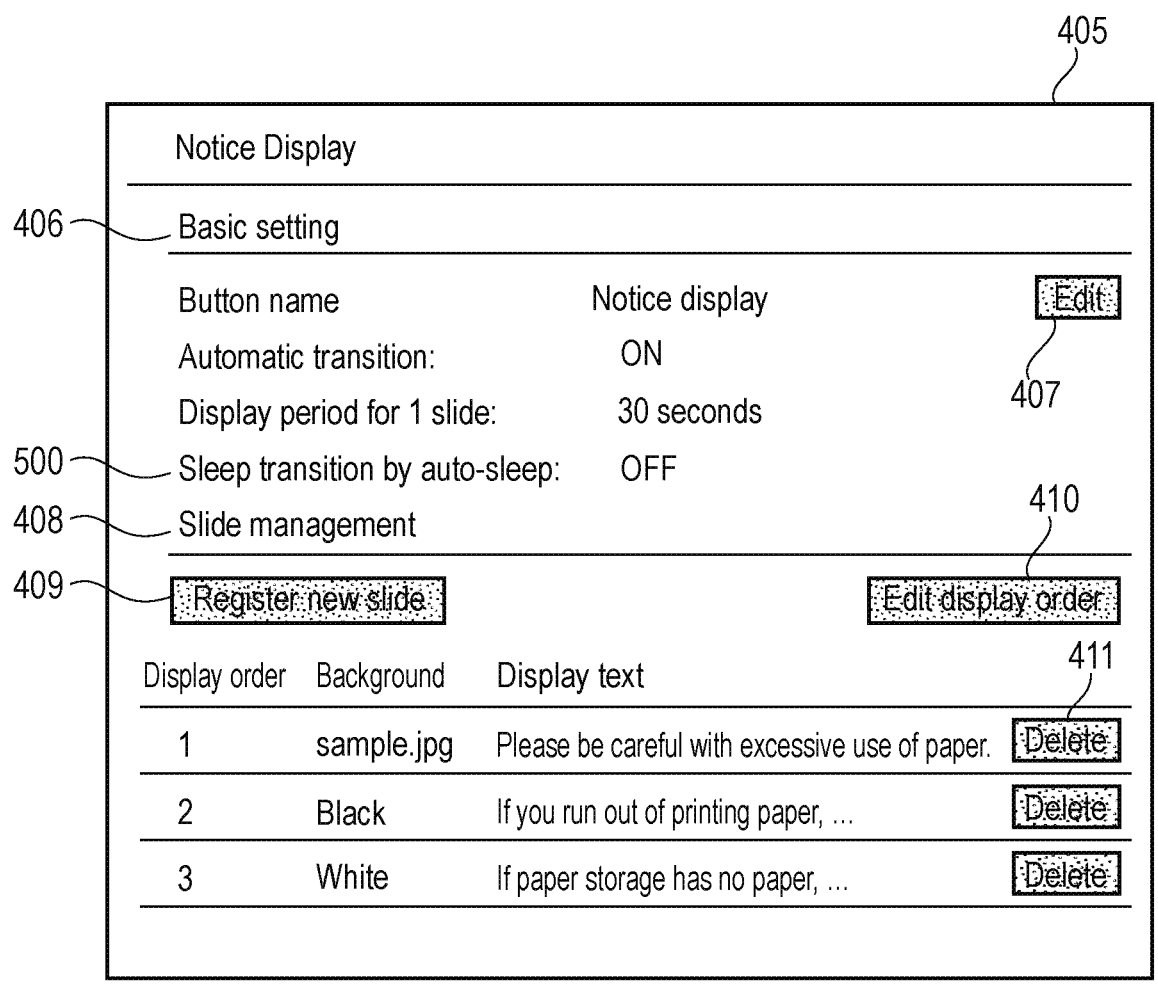
FIG. 22 is a diagram illustrating an example of a notice display setting window of the RUI of a second modified example according to one embodiment.

FIG. 22 is a diagram illustrating an example of the notice display setting window 405 in the RUI of the information processing device 100 in the second modified example. Compared to the first embodiment or the first modified example, a sleep transition 500 caused by auto-sleep is added. When a sleep transition due to auto-sleep is set to OFF in the notice display function, the CPU 101 performs no sleep transition during a slideshow even if the auto-sleep transition period elapses without any user operation being performed. This enables the manager of the information processing device 100 to easily set whether or not to permit a sleep transition during a slideshow, and an important message or the like can be more likely to be conveyed to the user without being prevented by the auto-sleep function.

Figure 23:
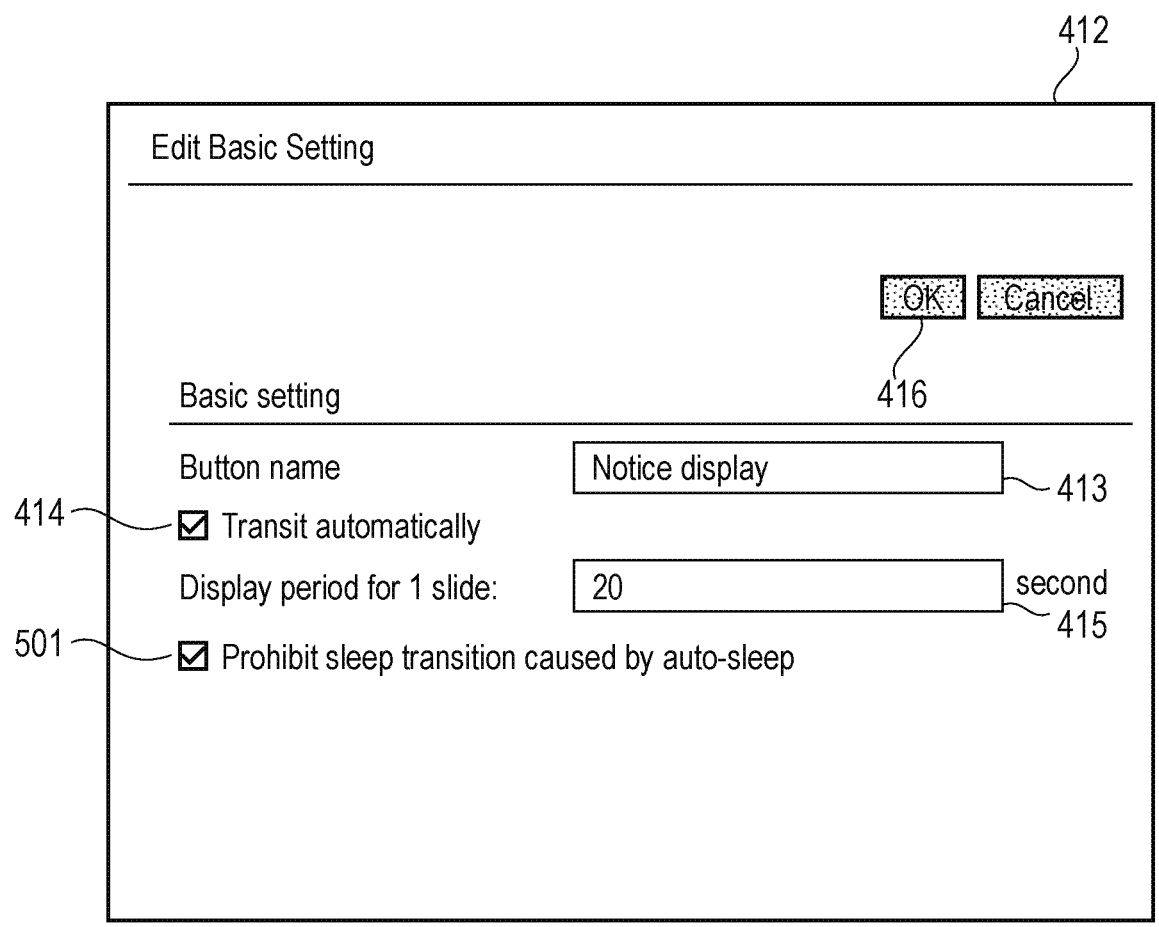
FIG. 23 is a diagram illustrating an example of an edition window of basic settings of the RUI of the second modified example according to one embodiment.

FIG. 23 is a diagram illustrating an example of the basic setting edition window 412 in the RUI of the information processing device 100 in the second modified example. The difference from the first embodiment or the first modified example is in that a checkbox 501 is added. When the checkbox 501 is checked, even when the auto-sleep transition period elapses without any user operation being performed, no sleep transition is triggered during a slideshow.

Figure 24:
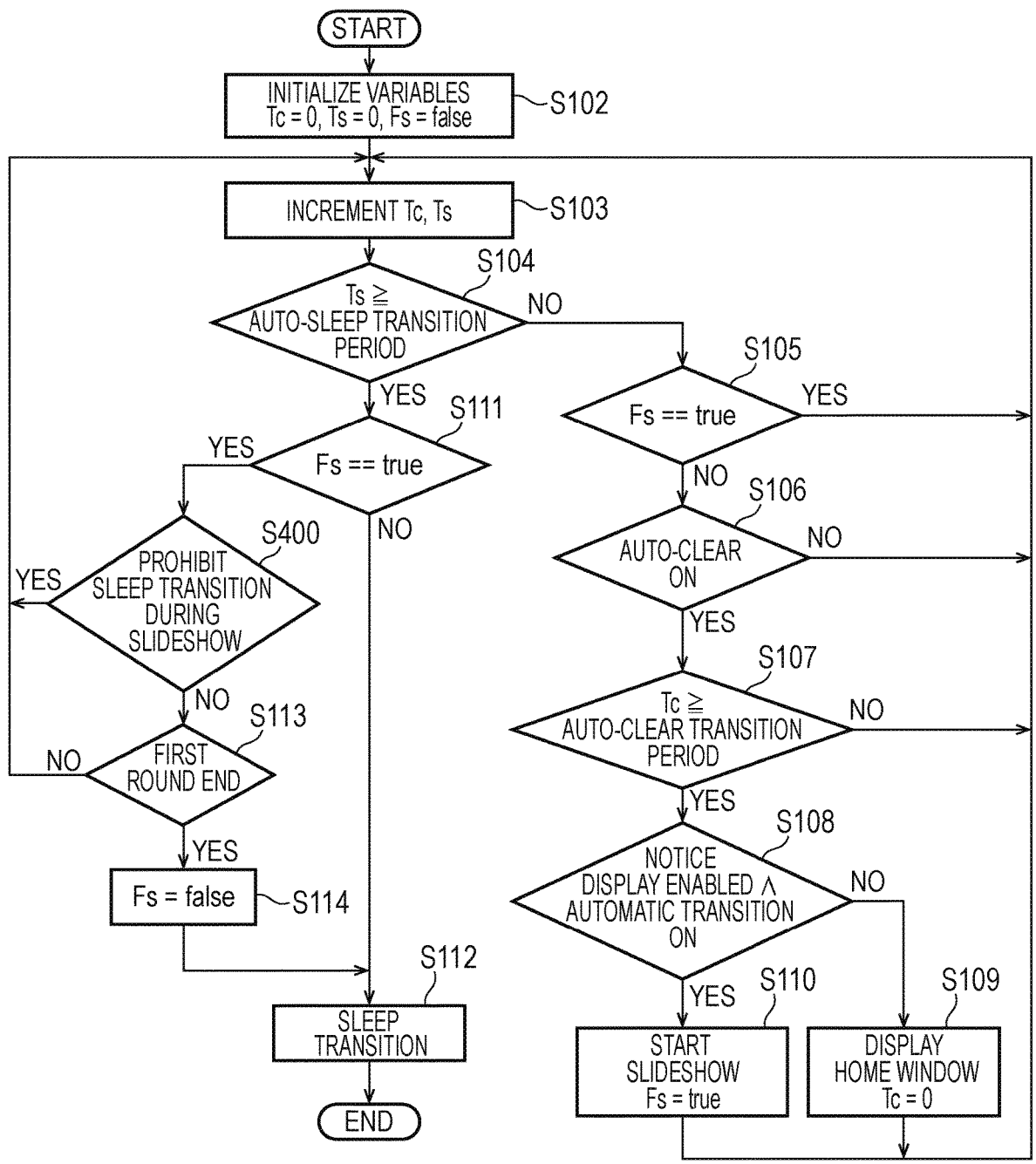
FIG. 24 is a flowchart illustrating an example of information processing of the second modified example according to one embodiment.

FIG. 24 is a flowchart illustrating an example of information processing in the information processing device 100 in the second modified example. The difference from the first embodiment is in that step S400 is added. If it is determined in step S111 that a slideshow is being performed, the CPU 101 proceeds with the process to step S400.

In step S400, if the sleep transition due to auto-sleep during a slideshow is not triggered, the CPU 101 returns to step S103.

When it is set not to perform a sleep transition due to auto-sleep during a slideshow, no sleep transition due to auto-sleep is triggered even when the notice display button 303 is selected. When it is set to perform a sleep transition by the auto-sleep during a slideshow, the process in the information processing device 100 when the notice display button 303 is selected is the same as that in the first embodiment.

Although the checkbox 501 used for setting whether or not to perform a sleep transition due to auto-sleep during a slideshow is prepared in the basic setting edition window 412 in the second modified example, a configuration in which a sleep transition due to auto-sleep during a slideshow is forced to be prohibited may be employed.

According to the second modified example, in an information processing device to which a signage application for displaying a slideshow is introduced, during a slideshow being performed, no sleep transition is triggered in response to expiration of the auto-sleep transition period even when the auto-sleep function is enabled.

Other Embodiments

As set forth, although some embodiments of the present disclosure have been described in detail, the present disclosure is not limited to such particular embodiments. An example of the information processing device may be an image forming device such as an MFP.

In an information processing device to hick a signage application for displaying a slideshow is introduced, it is possible to prevent a sleep transition from being triggered by the auto-sleep function during a slideshow.

According to the present disclosure, it is possible to prevent a sleep transition from being triggered by the auto-sleep function during a slideshow.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147612, filed Aug. 9, 2019, which is hereby incorporated by reference herein in its entirety.

What is claimed is:

1. An information processing device comprising:
a controller including a processor, the controller configured to:
register a character string;
display the registered character string on a display unit based on a condition that no user operation was performed for a first period; and
stop display based on at least a condition that no user operation was performed for a second period,
wherein even when the second period elapses with no user operation being performed, the controller does not stop the display until the last character of the character string is displayed when the registered character string is being displayed.

2. The information processing device according to claim 1, wherein the controller is further configured to set a setting based on a user instruction so as not to stop display on the display unit during display of the registered character string,
wherein based on the user instruction, the controller does not stop the display on the display unit even when display of the character string is completed.

3. The information processing device according to claim 1, wherein the controller is further configured to accept the registered character string from an external terminal.

4. The information processing device according to claim 3, wherein the controller accepts, from the external terminal, a setting as to whether or not to display the registered character string.

5. The information processing device according to claim 1,
wherein the controller is further configured to:
register a plurality of character strings;
cause the plurality of registered character strings to be displayed sequentially on the display unit, and
not stop the display on the display unit until display of the last character string of the plurality of character strings is completed.

6. The information processing device according to claim 1, wherein when the second period is longer than the first period, the display unit continues to perform display of a registered character string at least the second period elapses or a user operation is accepted.

7. The information processing device according to claim 1, wherein the first period is a period set by a user.

8. The information processing device according to claim 1, wherein the second period is a period set by a user.

9. The information processing device according to claim 1, wherein the controller ends display of the character string in response to accepting a user operation during display of the character string.

10. The information processing device according to claim 1, wherein the controller starts display on the display unit in response to accepting a user operation after stopping display on the display unit.

11. The information processing device according to claim 1, wherein the controller stops the display when the second period elapses with no user operation, in a case that the last character of the character string has been displayed.

12. The information processing device according to claim 1, wherein even when the second period elapses with no user operation, the controller does not stop the display and keeps displaying the registered character string until the last character of the character string is displayed.

13. An information processing method performed by an information processing device comprising a controller including a processor, the information processing method comprising:
a registration step of registering a character string;
a display control step of displaying the registered character string on a display unit based on a condition that no user operation was performed for a first period; and
a control step of stopping display based on at least a condition that no user operation was performed for a second period,
wherein even when the second period elapses with no user operation being performed, the control step does not stop the display until the last character of the character string is displayed when the registered character string is being displayed.

14. A non-transitory computer readable medium storing an information processing method that comprises:
a registration step of registering a character string;
a display control step of displaying the registered character string on a display unit based on a condition that no user operation was performed for a first period; and
a control step of stopping display based on at least a condition that no user operation was performed for a second period,
wherein even when the second period elapses with no user operation being performed, the control step does not stop the display until the last character of the character string is displayed when the registered character string is being displayed.

* * * * *